United States Patent [19]
Wimble et al.

[11] Patent Number: 5,778,230
[45] Date of Patent: Jul. 7, 1998

[54] GOAL DIRECTED OBJECT-ORIENTED DEBUGGING SYSTEM

[75] Inventors: Michael D. Wimble, Sunnyvale; Lawrence L. You, San Jose, both of Calif.

[73] Assignee: Object Technology Licensing Corp., Cupertino, Calif.

[21] Appl. No.: 557,768

[22] Filed: Nov. 13, 1995

[51] Int. Cl.$^6$ .................................................. G06F 11/30
[52] U.S. Cl. ................. 395/704; 395/183.14; 395/185.1
[58] Field of Search .............................. 395/704, 701, 395/180, 183.01, 183.14, 184.01, 185.01, 185.1

[56] References Cited

U.S. PATENT DOCUMENTS

| | | | |
|---|---|---|---|
| 4,821,220 | 4/1989 | Duisberg | 364/578 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,151,987 | 9/1992 | Abraham et al. | 395/575 |
| 5,181,162 | 1/1993 | Smith et al. | 364/419 |
| 5,226,162 | 7/1993 | Daw | 395/704 |
| 5,297,284 | 3/1994 | Jones et al. | 395/700 |
| 5,313,616 | 5/1994 | Cline et al. | 395/704 |
| 5,315,703 | 5/1994 | Matheny et al. | 395/164 |
| 5,317,741 | 5/1994 | Schwanke | 395/700 |
| 5,325,533 | 6/1994 | McInerney et al. | 395/700 |
| 5,327,562 | 7/1994 | Adcock | 395/700 |
| 5,339,430 | 8/1994 | Lundin et al. | 395/700 |
| 5,339,438 | 8/1994 | Conner et al. | 395/700 |
| 5,388,268 | 2/1995 | Beach et al. | 395/704 |
| 5,418,941 | 5/1995 | Peters | 395/704 |
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |
| 5,548,717 | 8/1996 | Wooldridge et al. | 395/704 |

OTHER PUBLICATIONS

Dumas, Joseph and Paige Parsons. "Discovering the Way Programmers Think: New Programming Environments." *Communications of the ACM*. Jun. 1995: pp. 45–56.

Pascoe, Geoffrey A. "Encapsulators: A New Software Paradigm in Smalltalk-80." *OOPSLA '86 Proceedings* Sep. 1986: pp. 341–346.

Putrilo, James M. and Joanne M. Atlee. "Module Reuse by Interface Adaptation." *Software–Practice and Experience*. Jun. 1991: pp. 539–556.

Lam, Siman S. "Protocol Conversion." *IEEE transactions on Software Engineering*. Mar. 1988: pp. 353–362.

Thatte, Satish R. "Automized Synthesis of Interface Adapters for Reusable Classes." *POPL '94*. Jan. 1994: pp. 174–187.

(List continued on next page.)

*Primary Examiner*—Kevin A. Kriess
*Attorney, Agent, or Firm*—Kupirka & Jobse

[57] ABSTRACT

A human oriented object programming system provides an interactive and dynamic process for debugging computer programs which facilitates the development of complex computer programs such as operating systems and large applications with graphic user interfaces (GUIs). The system performs goal directed debugging in response to a user request. The user merely inputs a high level debugging request, and the system breaks down the request into a set of goals and subgoals for implementing the high level user request. The system automatically develops one or more hypotheses which are tested in attempting to handle the debugging request of the user. Once a hypothesis is found to be true, the system automatically initiates backtracking, and further hypothesis, if necessary, to carry out the user request.

49 Claims, 29 Drawing Sheets

OTHER PUBLICATIONS

Yellin, Daniel M. and Robert E. Strom. "Interfaces, Protocols, and the Semi–Automatic Construction of Software Adaptors." *OOPSLA* '94. Oct. 1994: pp. 176–190.

Jacobson, Ivar and Fredrik Lindstrom. "Re–engineering of old systems to an object–oriented architecture." *OOPSLA* '91. pp. 340–350.

Filman, Robert E. "Retrofitting Objects." *OOPSLA* '87. Oct. 1987: pp. 342–353.

Dietrich, Walter C., Lee R. Nackman and Franklin Gracer. "Saving a Legacy with Objects." *OOPSLA* '89. Oct. 1989: 77–83.

Dotts, Alan and Don Birkley. "Development of Reusable Test Equipment Software Using Smalltalk and C." *OOPSLA* '92. Oct. 1992: pp. 31–35.

Duntemann, Jeff and Chris Marinacci. "New Objects for Old Structures." *BYTE*. Apr. 1990: pp. 261–266.

Alabiso, Bruno. "Transformation of Data Flow Analysis Models to Object–oriented design." *OOPSLA* '88. Sep. 1988: pp. 335–353.

Madhavji, Nazim H., Jules Desharnais, Luc Pinsonneault, and Kamel Toubache. "Adapting Modules to an Integrated Programming Environment." *IEEE International Conference on Programming Languages*, 1988: pp. 364–371.

Dutt, Nikil D. "Legend: A Language for Generic Component Library Description." *IEEE International Conference on Computer Languages*, 1990: 198–207.

5,778,230

GOAL DIRECTED OBJECT-ORIENTED DEBUGGING SYSTEM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to computer aided software engineering (CASE) and, more particularly, to a debugging system which provides an interactive and dynamic environment for computer program debugging.

2. Description of the Prior Art

Object-oriented programming (OOP) is the preferred environment for building user-friendly, intelligent computer software. Key aspects of OOP are data encapsulation, inheritance and polymorphism. These elements may be used to generate a graphical user interface (GUI), typically characterized by a windowing environment having icons, mouse cursors and menus. While these three key aspects are common to OOP languages, most OOP languages implement the three key aspects differently.

Examples of OOP languages are Smalltalk and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The developer does not need to be concerned with the type of data; rather, the developer need only be concerned with creating the right order of a message and using the right message. C++ was developed by Bjarne Stroustrup at the AT&T Bell Laboratories in 1983 as an extension of C. The key concept of C++ is class, which is a user-defined type. Classes provide object-oriented programming features. C++ modules are compatible with C modules and can be linked freely so that existing C libraries may be used with C++ programs.

The complete process of running a computer program involves translation of the source code written by the developer to machine executable form, referred to as object code, and then execution of the object code. The process of translation is performed by an interpreter or a compiler. In the case of an interpreter, the translation is made at the time the program is run, whereas in the case of a compiler, the translation is made and stored as object code prior to running the program. That is, in the usual compile and execute system, the two phases of translation and execution are separate, the compilation being done only once. In an interpretive system, such as the Smalltalk interpreter, the two phases are performed in sequence. An interpreter is required for Smalltalk since the nature of that programming environment does not permit designation of specific registers or address space until an object is implemented.

A compiler comprises three parts; the lexical analyzer, the syntax analyzer, and the code generator. The input to the lexical analyzer is a sequence of characters representing a high-level language program. The lexical analyzer divides this sequence into a sequence of tokens that are input to the syntax analyzer. The syntax analyzer divides the tokens into instructions and, using a database of grammatical rules, determines whether or not each instruction is grammatically correct. If not, error messages are produced. If correct, the instruction is decomposed into a sequence of basic instructions that are transferred to the code generator to produce a low-level language. The code generator is itself typically divided into three parts; intermediate code generation, code optimization, and code generation. Basically, the code generator accepts the output from the syntax analyzer and generates the machine language code.

To aid in the development of software, incremental compilers have been developed in which the compiler generates code for a statement or a group of statements as received, independent of the code generated later for other statements, in a batch processing operation. The advantage of incremental compiling is that code may be compiled and tested for parts of a program as it is written, rather than requiring the debugging process to be postponed until the entire program has been written. Even traditional incremental compilers, however, must reprocess a complete module each time.

Optimizing compilers produce highly optimized object code which, in many cases, makes debugging at the source level more difficult than with a non-optimizing compiler. The problem lies in the fact that although a routine will be compiled to give the proper answer, the exact way it computes that answer may be significantly different from that described in the source code. Some things that the optimizing compiler may do include eliminating code or variables known not to affect the final result, moving invariant code out of loops, combining common code, reusing registers allocated to variables when the variable is no longer needed, etc. Thus, mapping from source to object code and vice versa can be difficult given some of these optimizations. Inspecting the values of variables can be difficult since the value of the variable may not always be available at any location within the routine. Modifying the values of variables in optimized code is especially difficult, if not impossible. Unless specifically declared as volatile, the compiler "remembers" values assigned to variables and may use the "known" value later in the code without rereading the variable. A change in that value could, therefore, produce erroneous program results.

While there have been many advances in the art of computer program building, testing and developing, the known software development tools still place a substantial burden on the developer, often requiring insightful intuition. In addition, traditional batch oriented programming systems provide for very long edit-compile-test cycles which is very disruptive to the creative act of programming.

There has been some research in various small aspects of debugging, such as solving specific problems inherent in debugging code which has been "optimized" in various ways, or in using different paradigms in the debugger engine.

Several basic problems of debugging still exist, namely: Debugging, as a practice, is still in large part an art instead of being predominately an engineering science; debugging represents a large component of the time and money required to create and maintain software; programs have grown in complexity in recent years but debuggers have not evolved to help manage that complexity; compilers have evolved in their ability to optimize code but debuggers have not evolved to the same extent to adequately debug that optimized code; and, typical debuggers provide no special support for the newer software paradigms, such as distributed computing and client/server architectures.

With current software practices, and the inadequacies of typical debuggers, any improvement in the debugger tool will likely have a large payback. The debugger disclosed herein addresses the above problems and more in an attempt to reduce the cost of software development and increase the quality of software produced.

For quite a few years now, debuggers have fundamentally all looked alike and performed alike, aside from differences such as their human interface presentation. While compiler technology has advanced, while program complexity has increased, and while new paradigms for computing have come about, the debugger tool hasn't fundamentally changed in response. While debugging remains a huge cost and time component of program development, the debugger has done little to reduce that cost.

Conventional debuggers still largely present an interface that allows the user to set breakpoints, step the program in various ways and look at and alter data objects in a running program. Minor variations from this allow the debugger to perform scripted actions when a breakpoint is hit, to invoke a user function from the debugger, or to provide data watchpoints. Specialized debuggers sometimes provide more interesting ways of visualizing program data. Using the debugger engine, or duplicating some of its functionality, other tools provide coverage and performance analysis. While these are all valuable functions of a debugger, they are fundamentally limited by the skill of the user.

For instance, if the user has stopped a program while it is executing a function and wants to set a breakpoint at a later statement in the function, and the breakpoint is to be taken only in the same execution context as when it is set, most debuggers require the user to note the context in which the breakpoint is hit and determine if the correct context exists when the breakpoint is hit. This is a tedious and error prone process.

Or consider that a user wants to set a breakpoint at a statement on the true leg of an if-statement, but not for the same statement in the false leg, and both statements have been merged together due to common tail merging. Most debuggers will simply set a breakpoint at the code for the statement and ignore the implications of the common tail merging. It is up to the user to invent some additional method of determining if the statement was executing as part of the true leg or false leg of the if-statement.

If a user wants to look for two particular states in a program, where one state follows the other, the user typically has to devise some method to detect both states, and manually observe the execution of the program to determine if the proper sequencing of states occurs.

If a user wants to do all of these things simultaneously, most conventional debuggers, if they allow it at all, require the user to be rather creative in creating some sort of method to manage all these simultaneous request. And when the user wants to add yet another request, they must often come up with yet another creative solution.

Debugging complex programs with conventional debuggers may be achievable, but the job is daunting, complex, and impractical. Debuggers have often been poorly utilized in the past because, among other reasons, they require the user to become an expert in a computer language, in an instruction set architecture, in a runtime system, in an operating system, in the program, in the debugger tool, and in the art and science of debugging itself.

The debugging system described herein provides a better solution to the problems mentioned above.

SUMMARY OF THE INVENTION

It is an object of the present invention to provide a human oriented, interactive and dynamic process for the debugging of computer programs which promotes better developer focus and concentration, and hence greater productivity. The disclosed debugging system solves the aforementioned problems utilizing a goal-directed problem solving framework where simultaneous complex problems are iteratively reduced to smaller problems. The framework takes a global view of simultaneous debugging requirements and executes the program which is controlled by the debugger utilizing the minimum number of constraints. This reduces the effect on the debugged program. The problem solving framework is also adaptive and adjusts itself to available services and changes the manner in which it tackles a problem based on the dynamic state of the program.

Using a goal directed framework for debugging provides a tool which is strong in capabilities, diverse in its services, extensible in its functionality, and easily adaptable to new problems. The proper implementation of goal directed problem eliminates or greatly reduces the burden of expert knowledge in computer languages, instruction set architecture, runtime system, operating system, debugger tool and the art and science of debugging. The debugger itself becomes the expert in many of these areas. The user continues to operate in his domain of expertise and need not be so distracted by the requirements of all the other knowledge domains.

DETAILED DESCRIPTION OF A PREFERRED EMBODIMENT OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The figures contained herein represent dimensions of both apparatus and method. That is, some of the figures detail both apparatus and methods in a single figure. The apparatus, for example, may be in the form of objects or programs, and methods, for example, may be in the form of functions and information transfer.

The present invention is implemented in a preferred embodiment as software executing on a processor. It should be understood that the preferred embodiment interchangeably represents both methods and apparatus. It should be understood, therefore, that where methods are discussed there are corresponding elements which make up an apparatus carrying out the method, and where apparatus is discussed there are corresponding methods embodied in the apparatus. For example, where a method step is performed by software being executed there is a corresponding apparatus for carrying out the method step.

It should also be kept in mind that the objects referred to herein have the characteristics of objects in general, unless stated otherwise. In other words, the objects discussed herein have characteristics of extensibility, encapsulation, polymorphism, abstraction, persistency, etc.

Finally, it is to be understood that the apparatus and methods discussed below may be implemented using software or hardware or a combination of both. Therefore, the inventive apparatus and methods could be embodied in a computer readable and usable medium in the form of software which is used by a computer to implement the apparatus and methods discussed herein. Such a computer readable and usable medium is understood to include, but is not limited to, a memory used by a computer system. In general, this includes anything which could be considered usable and readable by a computer.

1.0 COMPUTER SYSTEM

The history of object-oriented programming and the development of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object-oriented systems, the reader is referred to "Object-Oriented Design With Applications" by Grady Booch.

Figure 1:
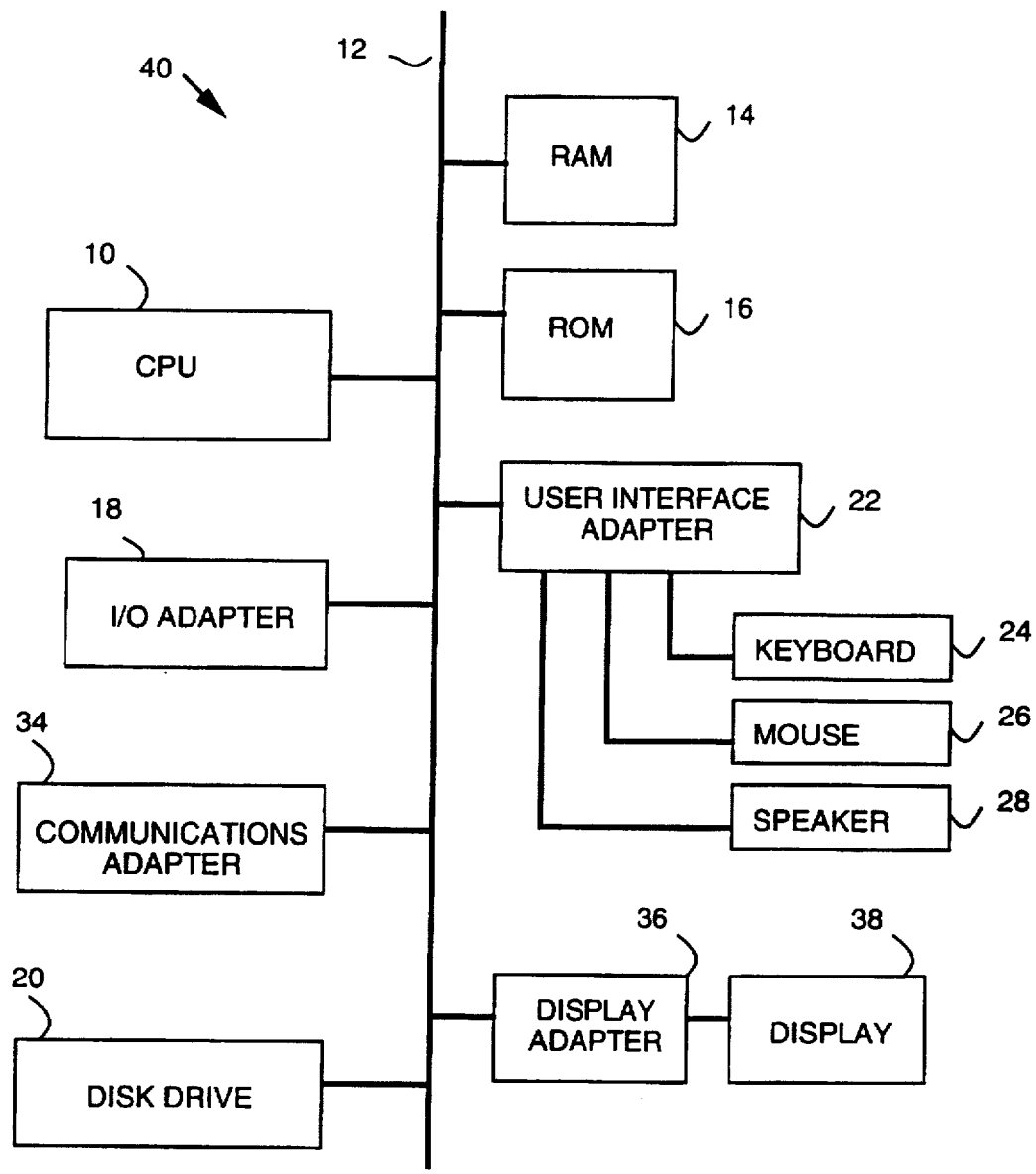
FIG. 1 illustrates a typical hardware configuration of a computer in accordance with the subject invention.

The invention is preferably practiced in the context of an operating system resident on a personal computer such as the IBM®, PS/2®, or Apple® Macintosh® computer. A representative hardware environment is depicted in FIG. 1, which illustrates a suitable hardware configuration of a workstation 40 in accordance with the present invention. The Workstation 40 has a Central Processing Unit 10, such as a conventional microprocessor, and a number of other units interconnected via a System Bus 12. The illustrated Workstation 40 shown in FIG. 1 includes a Random Access Memory (RAM) 14, a Read Only Memory (ROM) 16, an I/O Adapter 18 for connecting peripheral devices such as disk units to the Bus 12, a User Interface Adapter 22 for connecting a Keyboard 24, a Mouse 26, a Speaker 28, a Disk Drive 20, and/or other user interface devices such as a touch screen device (not shown) to the Bus 12. The Workstation 40 may also have a Communications Adapter 34 for connecting the Workstation 40 to a data processing Network and a Display Adapter 36 connecting the Bus 12 to a Display Device 38. The Workstation 40 has resident thereon an operating system such as the Apple System/7® operating system, or other commercially available operating system.

2.0 INTRODUCTION

The Goal Directed Debugger component of the present invention, which may be used as part of a Development Environment, uses a new paradigm for its organization. Derived from research in artificial intelligence, the debugger uses a goal directed problem solving approach. This approach provides for more powerful debugging tools, better dealing with program complexity, and the simultaneous management of many competing requirements during debugging.

Figure 2:
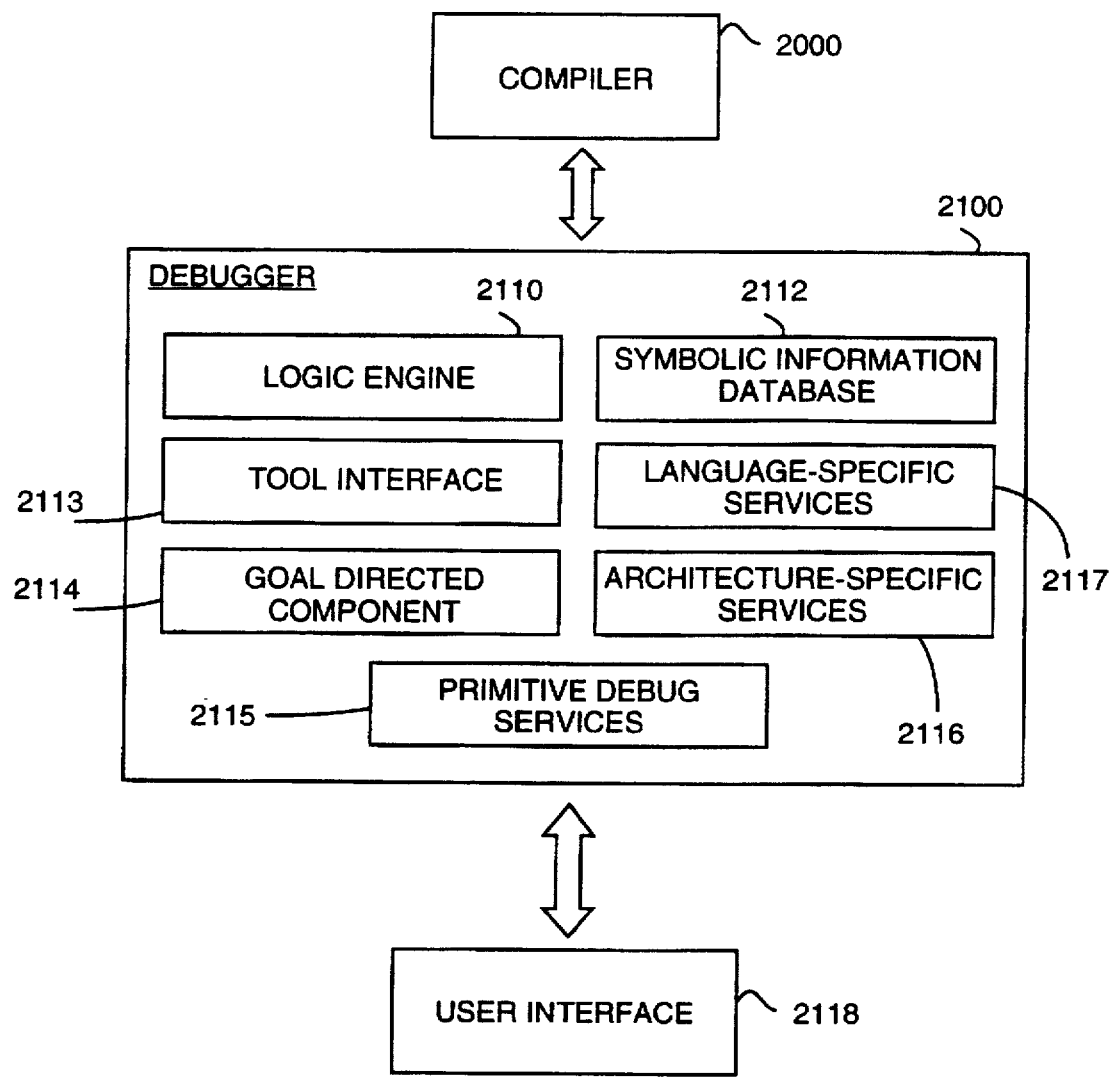
FIG. 2 is a flowchart showing the overall debugging scheme in accordance with the present invention.

As described above, and shown in FIG. 2, a Goal Directed Debugger 2100 is typically organized as a network of services, such as a Symbolic Information Database 2112, a Logic Engine 2110, a Tool Interface 2113, a language specific set of services 2117, an architecture specific set of services 2116, etc. One such component is a set of primitive target program control services. This service provides all the common target control services upon which all the other Goal Directed Debugger services or components depend. A Compiler 2000 describes the program utilizing a Goal Directed Debugger 2100 which in turn utilizes a Symbolic Information Database 2112. The Logic Engine 2110 provides basic services such as Database maintenance, State Machine control, constraint management and other services. The Tool Interface 2113 is a primary Application Program Interface (API) utilized by other tools that wish to access the debugging services. The Symbolic Information Database 2112 is interpreted by the Architecture Specific Services 2116 and Language Specific Services 2117 which interpret the architecture and language of a target program. Such information as register sets, stack frames, stack frame formats, and how software exception is implemented are encapsulated by these two services. The Primitive Debugging Services 2115 provide a set of services utilized by all debuggers such as reading and writing memory, setting breakpoints, instruction stepping and register inquiry. A User Interface Program 2118 is an example of a tool which uses the Goal Directed Debugger 2100.

The discussion below is of goal directed debugging in terms of C++ computer language interfaces. Goal directed debugging, however, is in no way tied to the C++ computer language or, indeed, even to object oriented programming.

Goal directed debugging is the technique of presenting the user with higher levels of tools—tools which present useful abstractions in debugging, and implementing those tools by breaking down a complex problem into simpler subproblems repeatedly until a simple set of problems results which can be solved using a set of primitive debugging services.

Figure 3:
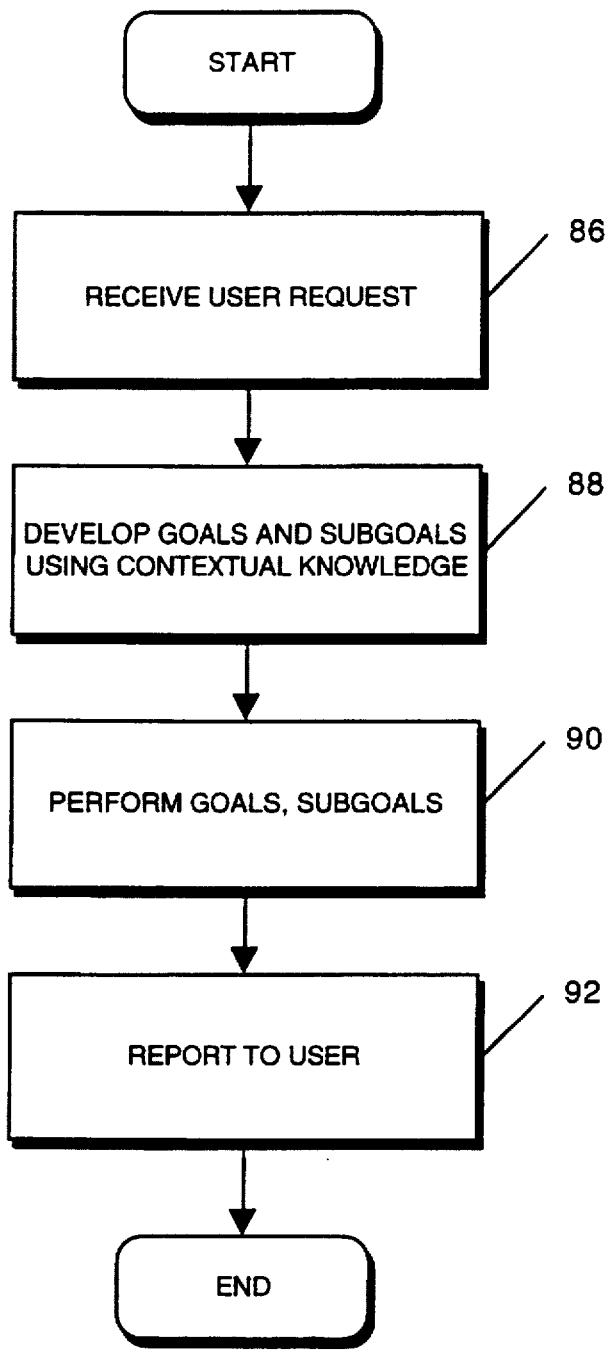
FIG. 3 is a flow chart demonstrating a debugging problem solving approach in which hypothesis are developed, tested by the debugging system, and redeveloped and tested again if necessary.
Figure 4:
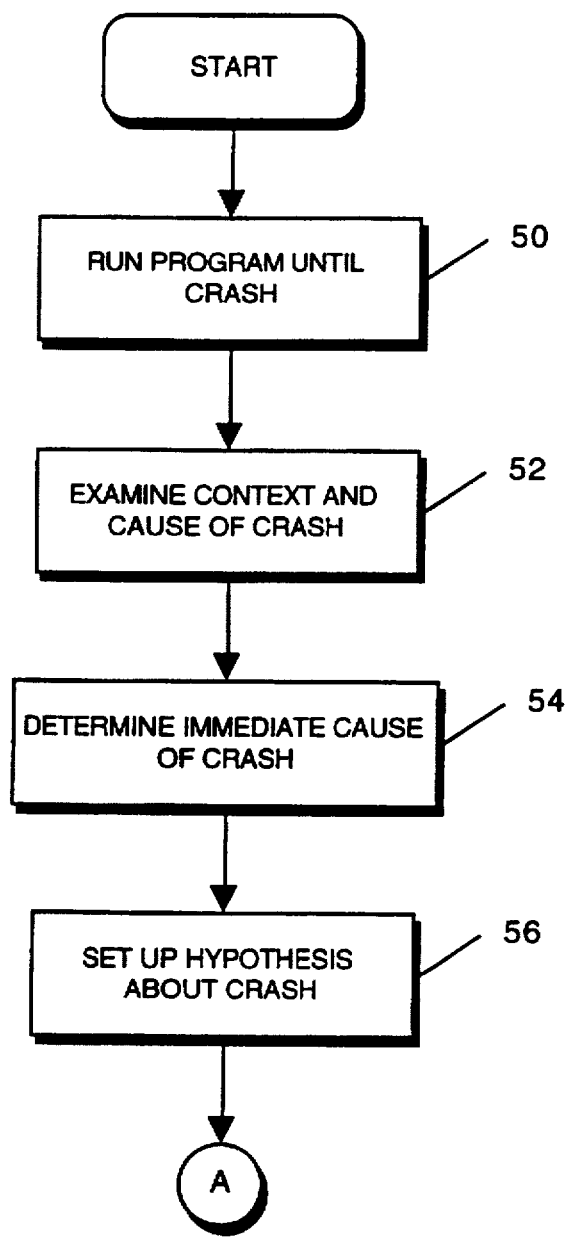
FIG. 4 is a flowchart demonstrating a debugging problem solving approach in which hypothesis are developed and tested by the debugging system.
Figure 5:
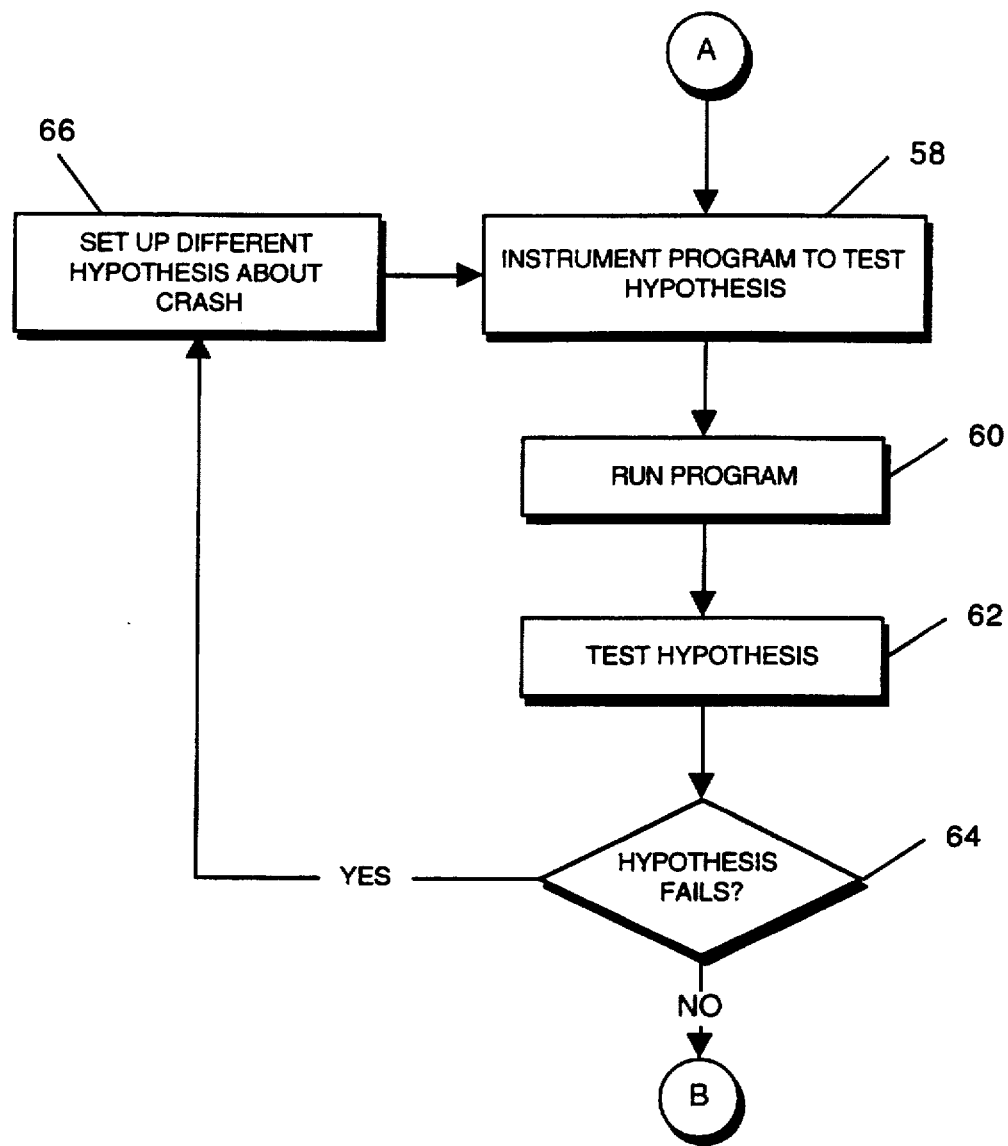
FIG. 5 is a flow chart showing the development of backtracking information.
Figure 6:
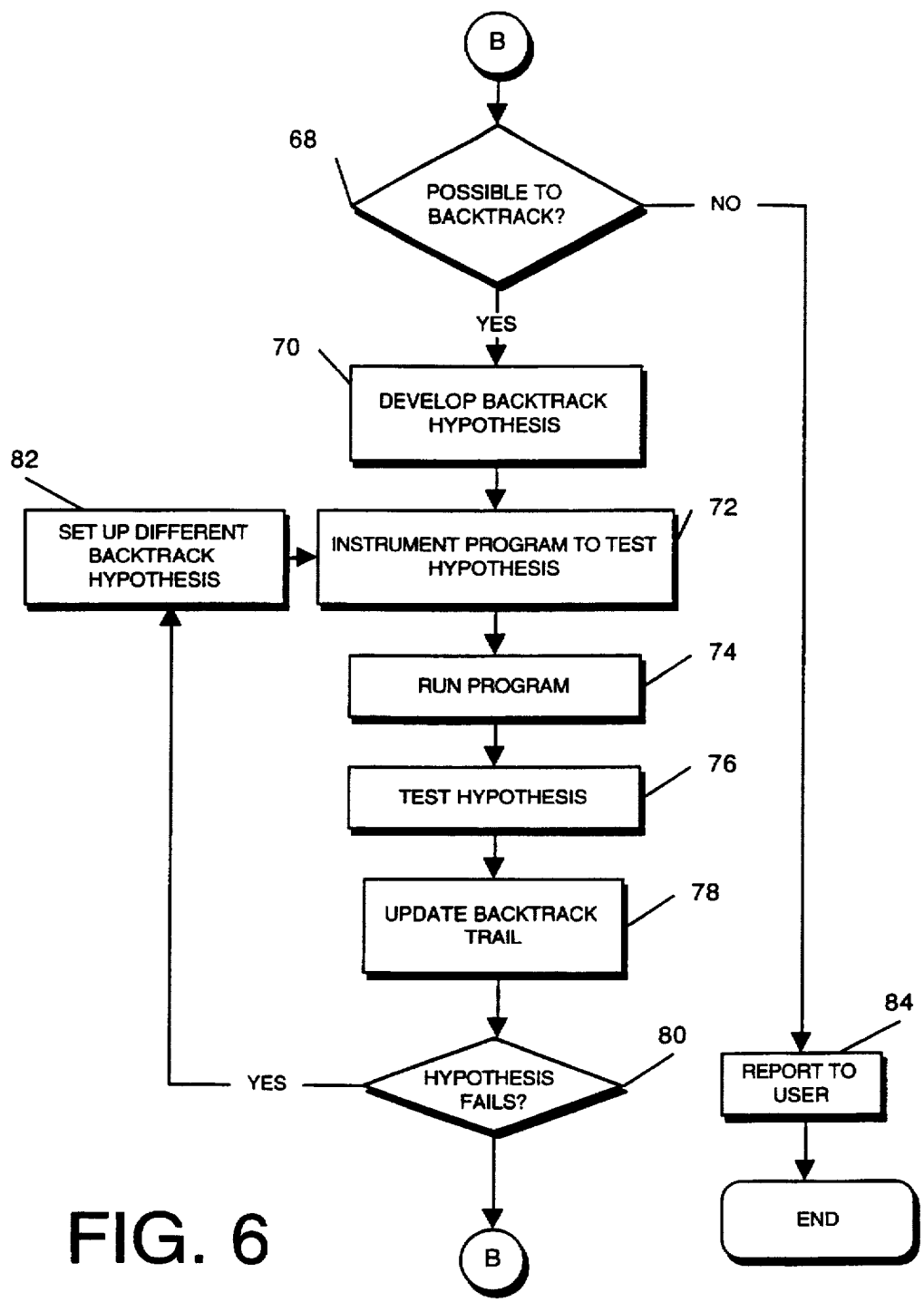
FIG. 6 is a flow chart, which is a continuation of the flowchart of FIG. 5, showing the development of backtracking information, if possible.

FIG. 3 is a flowchart showing the overall debugging scheme in accordance with the present invention. The flowcharts described below with respect to FIGS. 4–6 are an example of a process which may be developed by the debugging system disclosed herein. FIG. 3 shows a "big picture" view of how the Goal Directed Debugger 2100 develops the individual steps of the flowcharts of FIGS. 4–6. All of this can be achieved by a single high level user request (86). The request isn't implemented with hard code—the Goal Directed Debugger 2100 adopts adaptive behavior to solve the problem. The Goal Directed Debugger 2100 relies on contextual knowledge and forms a set of goals and sub goals to be solved which vary over time (88). The system then performs these goals and subgoals (90), and reports the findings of the goals and subgoals to the user (92). The Goal Directed Debugger 2100 understands bus errors, stack frames, virtual function calls, memory segmentation, and so forth. The user remains thinking about the problem in his own knowledge domain and doesn't have to become highly knowledgeable in all these other areas. Further, the user doesn't even have to perform the tedious work wherein it may be difficult to avoid human error.

FIG. 4 is a flowchart demonstrating a debugging problem solving approach in which hypothesis are developed and tested by the debugging system. FIG. 5 is a continuation of the FIG. 4 flowchart, and shows flowchart demonstrating a debugging problem solving approach in which hypothesis are developed and tested by the debugging system. Finally, FIG. 6 is a flow chart which is a continuation of the flowchart of FIG. 5, showing the development of backtracking information, if possible. Consider one scenario. A program crashes reproducibly. A high level problem solver in the Goal Directed Debugger 2100 might solve the problem. "Why does my program crash?". The Goal Directed Debugger architecture might convert that into the following sub goals:

1) Run the program until it crashes (50).
2) Examine the context and cause of the crash (52).
3) Determine the immediate cause of the crash (54). For example, if a bus error occurs, what variable was being referenced, or what statement was being executed at the time of the failure? If an illegal instruction was executed, what statement was being executed, or if no valid statement contained the illegal instruction, what statement called the code which eventually executed the illegal instruction?
4) Set up a hypothesis about the cause of the crash (56). For example, the hypothesis may be that a pointer variable had an illegal value, or that a virtual call was being made using an object of an improper class.
5) Instrument the program to test the hypothesis (58). For instance, set a breakpoint just before the pointer variable is to be used and test the validity of its value, or set a breakpoint just before a virtual call is to be made and test the class type of the object.
6) Run the program (60).
7) Test the hypothesis (62).
8) If the hypothesis fails (64), set up a different hypothesis (66) and begin again at step 5.
9) If the hypothesis succeeds, is it possible to backtrack the cause of the failure (68)? For instance, was the pointer value developed as the result of an expression evaluation or function call, or was it passed as a parameter? Was the object used for the virtual method call derived via an expression evaluation or function call, or was it passed as a parameter?
10) If a backtracking hypothesis exists (70), flow begins again in a similar manner to that described above with respect to steps 5–8 (72, 74, 76, 80 and 82) to test the hypothesis. A trail of the backtracking is kept (78).
11) Report to the user the results of the hypothesis tested and any backtracking (84).

There are levels in goal directed debugging. A problem solver such as just described with respect to FIGS. 3–6 would probably fit into the highest level of goal directed frameworks. Note that even in the description above the problem solver relied on lower levels of problem solving services, such as "run the program until it crashes", or "what variable was being referenced", or "instrument the program to test the hypothesis."

Figure 7:
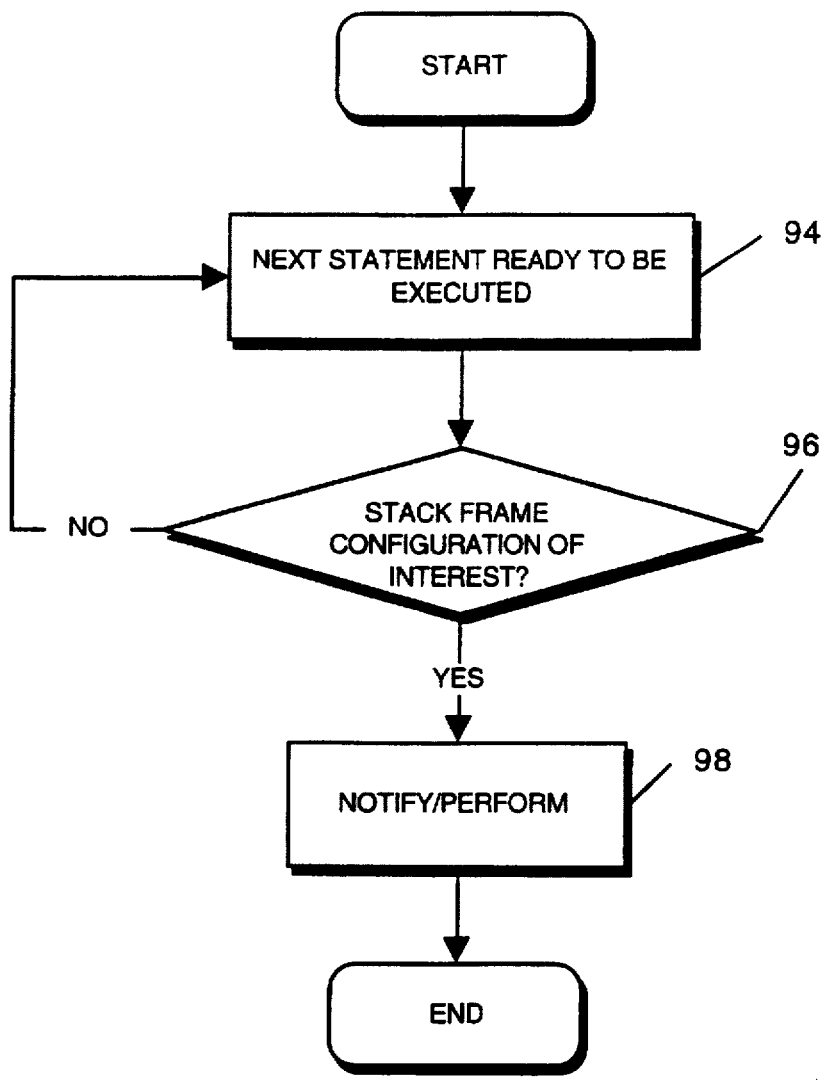
FIG. 7 provides an example of a fairly low level Goal Directed Debugger which simply knows how to execute until the next statement is about to be executed in the current context.

FIG. 7 provides an example of a goal directed problem solver in accordance with a preferred embodiment which executes until the next statement is about to be executed 94 in the current context 96. Upon detection that the next statement ready to be executed is in the stack frame configuration of interest, a notification to interested parties may be made, or a function be performed 98, such as stopping execution. "Current context" means that if the function were recursively called, either directly or indirectly, execution of the following statement in that context is not interesting; or if the function returns and is called again later, execution of the following statement in that context is not interesting. Only when the next statement is about to be executed with the same configuration of stack frames as when the goal was developed would there be interest. The current statement might:

1) Make a recursive call. As just described, any execution of the next statement will be ignored until there is a return to the original context.
2) Return from the current function. In this case, the next statement will never be executed in the current context, so the Goal Directed Debugger 2100 will stop at the next instruction in the caller's context.
3) Raise an exception, do a longjump, or perform some other operation which might result in the current context being destroyed. In this case, the next statement will never be executed in the current context, so the Goal Directed Debugger 2100 will stop at the next available instruction in the new context.

Surprisingly, most debuggers, when asked to execute until the next statement is about to be executed in a function, fail to operate as expected in all 3 of the above situations. If the current statement executes a recursive call, the debugger typically considers the "about to execute the next statement" request to be the same as a "step over the current statement" request, which is not at all the same. Some debuggers are smart enough to handle the case where the current function returns, others will allow the program to run on forever until some other breakpoint is hit or some other user-specified action causes the program to stop. Most debuggers probably don't handle the third situation at all. A very poorly designed debugger may have left a breakpoint at the next statement, and when a raised exception is handled in an enclosing context, and the method is later called again, the breakpoint might be hit and the debugger will consider that the program has finally and correctly executed until the next statement was hit in that old context.

If the current statement is not a simple statement, but, say, a switch-statement or case-statement, different debuggers may have different interpretations of what it means to step over the current statement. Some will, in fact, treat "step over the current statement" to mean "execute until a different statement, not in a nested call, is about to be executed." In the case of a switch-statement or case-statement, stepping over the current statement could be defined to mean a stop at the statement following the case or switch statement, not stop at one of the case clauses within the current statement.

Equally important, if the current statement is a branch-to-self statement, some debuggers will not consider executing the same statement again as having satisfied a "step over the current statement" request.

With goal directed debugging, the correct handling of a "step over the current statement" request, even considering all the possible problems just discussed, is a fairly simply feat. Without goal directed debugging, it is not unusual for the user to have to consider all the above problems and do some additional action to handle each possibility.

Figure 8:
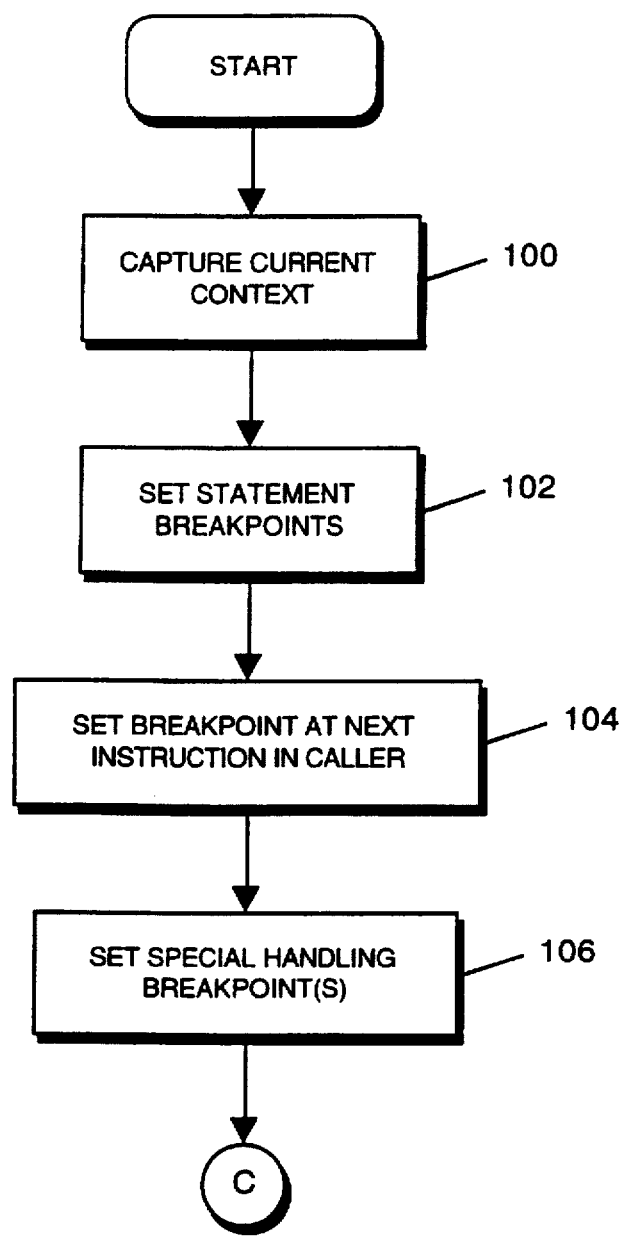
FIGS. 8 and 9 together shows how a low level Goal Directed Debugger performs the "step over the current statement"
Figure 9:
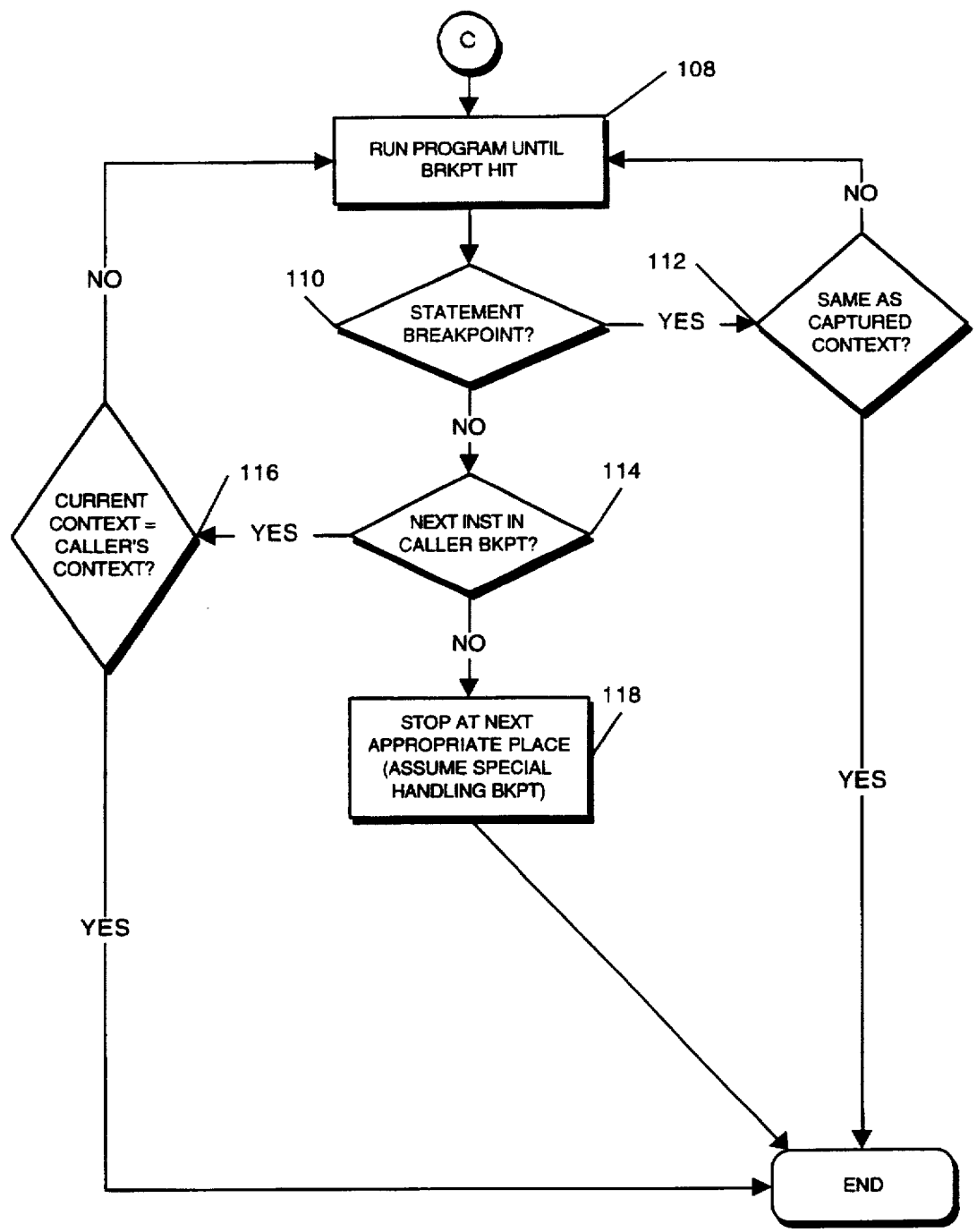

FIGS. 8 and 9 together show a low level Goal Directed problem solver for the "step over the current statement":

1) Capture the current context (i.e., set of frames) (100).
2) Set a breakpoint for every statement in the current function which is not contained within the current statement (e.g., ignore case handling within a case-statement if the current statement is a case-statement), including the current statement itself (102).
3) Set a breakpoint at the next instruction in the caller (104).
4) Set a breakpoint in code which handles exception handling, longjump handling, etc (106).
5) Run the program until any of the breakpoints above is hit (108).
6) If a breakpoint from step 2 is hit (110), see if the current context is the same as captured in step 1 (112). If so, we have achieved the goal; otherwise, go to step 5.
7) If a breakpoint for step 3 is hit (114), see if the current context is the caller's context of the frame in step 1 (116). If so, we have achieved the goal; otherwise, go to step 5.
8) If a breakpoint for step 4 is hit (118), we have achieved the goal, stop at the next appropriate place, such as in the exception handler or at the longjump target point.

The services referenced in the above primitive not themselves sub goals, but are primitive services provided by the Debugger Engine (see "Primitive services" below).

3.0 GOAL DIRECTED DEBUGGING ARCHITECTURE

One implementation of the above architecture uses the following set of components:

3.1 Goals

Figure 10:
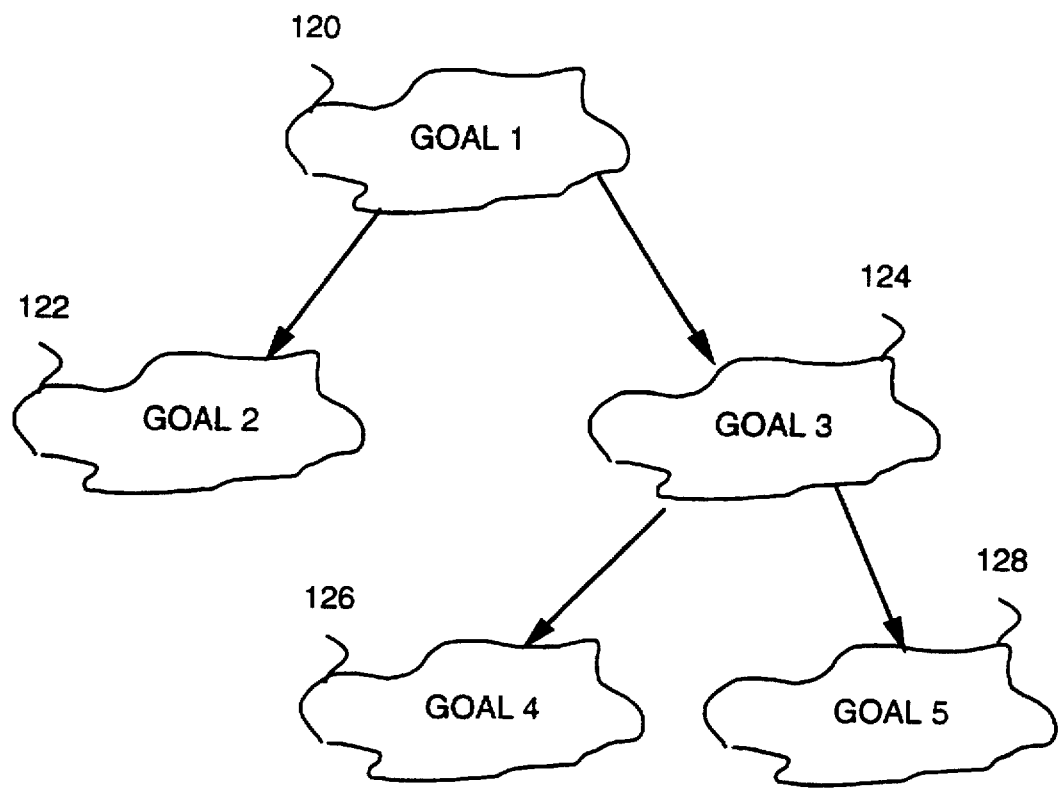
FIG. 10 is a diagram showing an example of one goal calling other goals in order to carry out a debugging function.

FIG. 10 is a diagram showing an example of one goal calling other goals in order to carry out a debugging function. As shown in the drawing, achieving Goal 1 (120) may rely on achieving Goal 2 (122) and/or Goal 3 (124). Achieving Goal 3 may in turn call Goal 4 (126) and/or Goal 5 (128). Goals are a class of objects which solve a specific problem. As shown, goals can use other goals to solve their problem.

Figure 11:
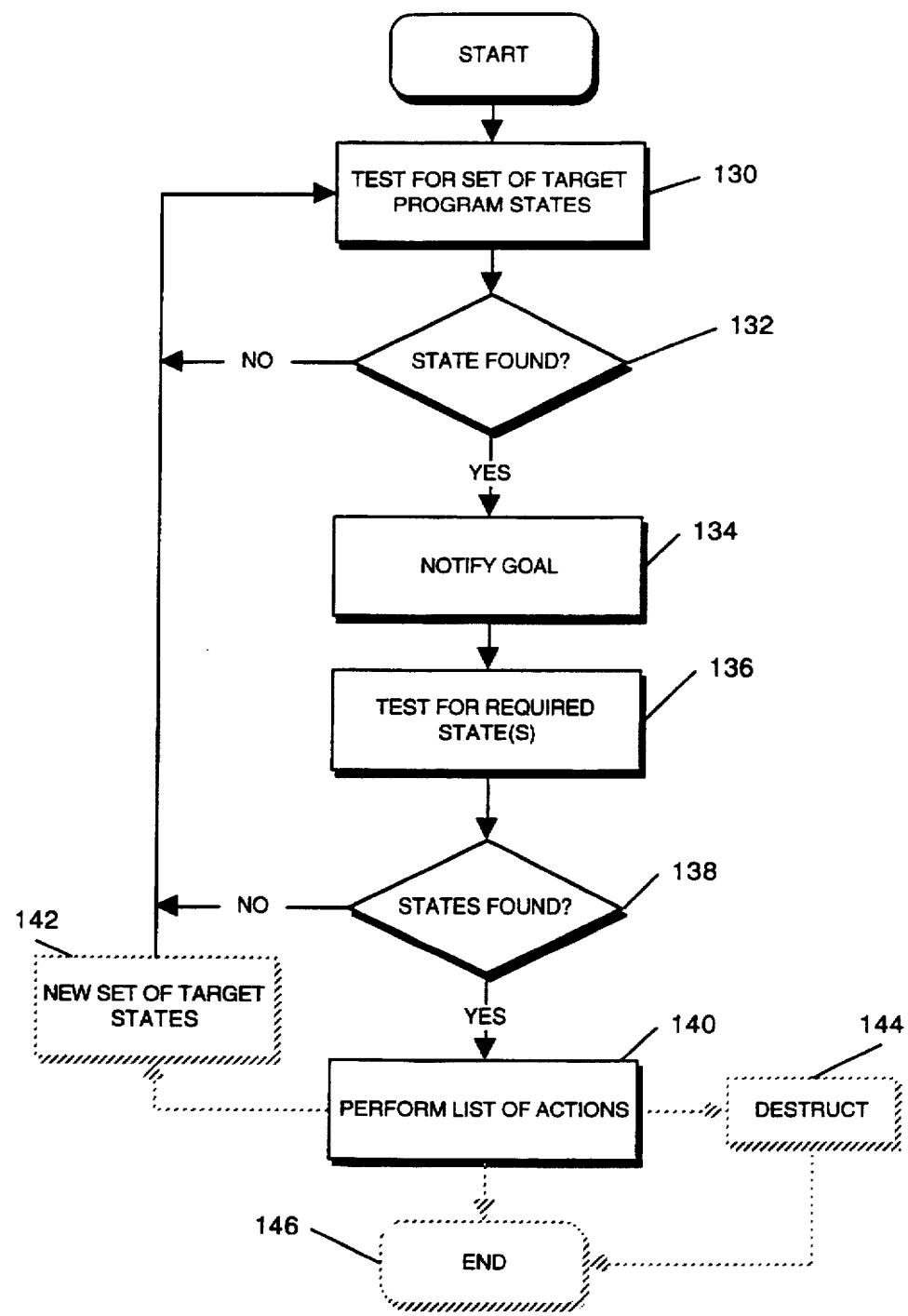
FIG. 11 shows the overall flow of how a goal implements itself.

FIG. 11 shows the overall flow of how a goal implements itself. A goal implements itself by testing for a set of target program states (130) which, if they ever exist (132), should cause the goal to be notified (134). As described herein, a goal may receive false notification of a state, so upon notification, the goal determines if the required states exist (136). If so (138), it performs a list of actions in response to recognition of a state (140). Some goals self destruct (144) when the goal is met. Other goals are persistent and continue to exist, looking for the same or a new set of states, indicated by 142. Other goals merely end, waiting to be called on again to perform (146). Steps 142, 144 and 146 are shown in phantom to indicate alternative courses a goal may take, depending upon the particular implementation of the goal.

Goals rely on optimistic notification. That is, while they indicate they want to be notified if any of a specific program state exists, they may get a false positive notification. A goal is responsible for verifying that an expected program state actually exists when it is notified. Goals also rely, however, on never missing the detection of a program state. A goal may get false positive notification, but it must never miss notification when the state exists.

3.2 Actions

Figure 12:
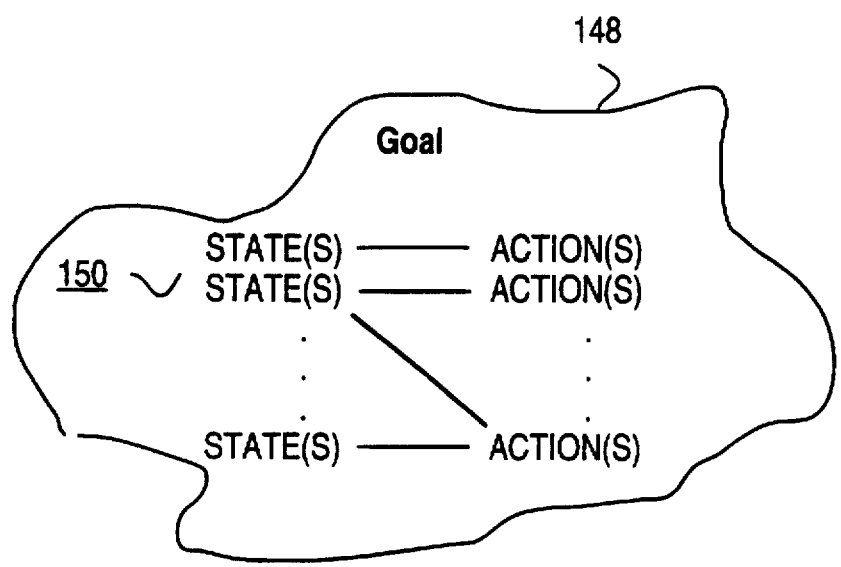
FIG. 12 is a diagram showing how a goal associates states and actions.

FIG. 12 is a diagram showing how a goal associates states and actions. Actions are a list of things to be done by a goal 148 when a particular state is detected. A goal may associate one or more actions with a particular state, and it may associate one or more states with a single action, as indicated generally by 150.

3.3 Primitive events

Figure 13:
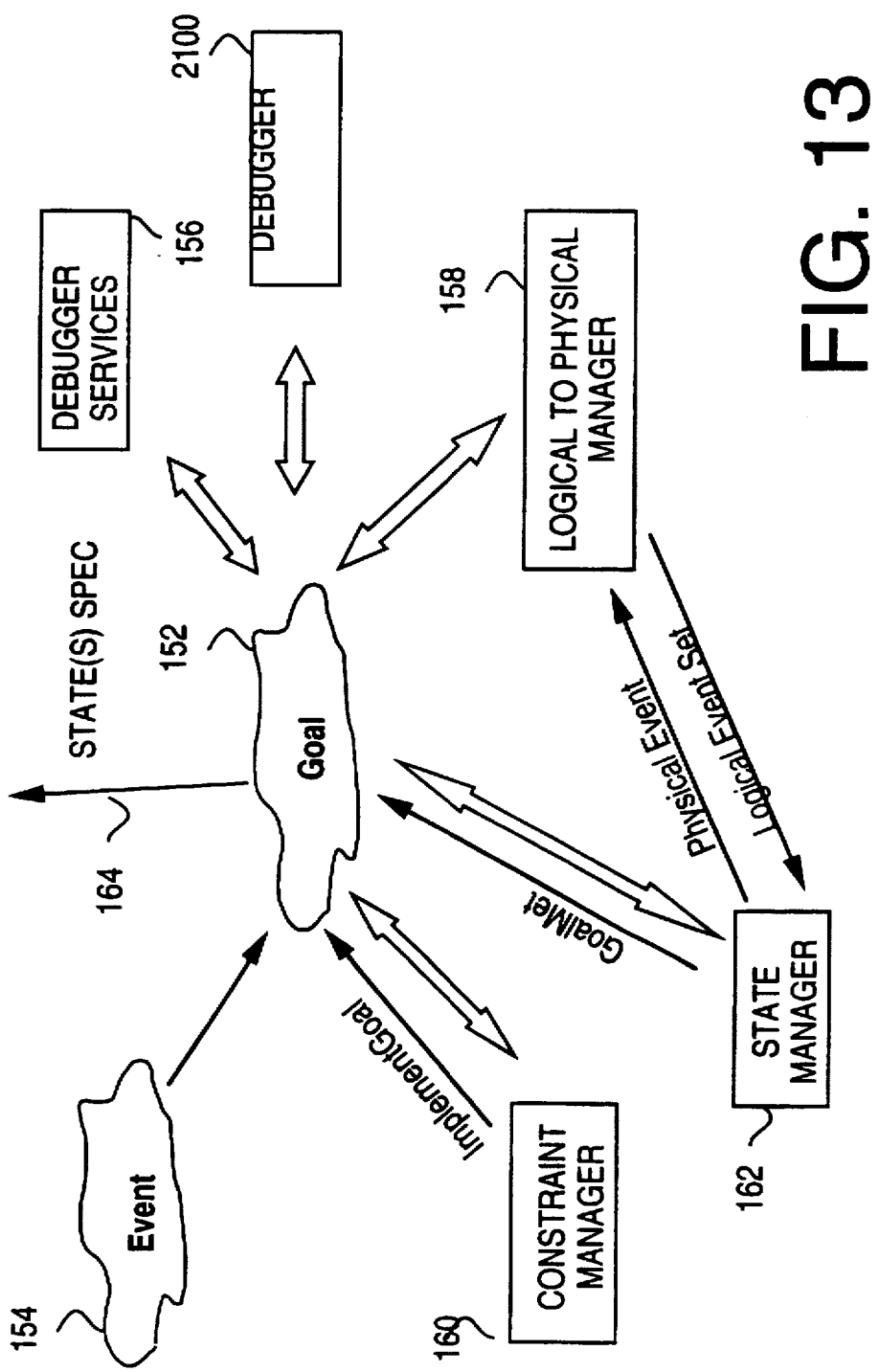
FIG. 13 is a block diagram showing how a goal may advantageously interact with various aspects of the system in accordance with the present invention.

FIG. 13 is a block diagram showing how a goal may advantageously interact with various aspects of the system in accordance with the present invention. FIG. 13 is representative only, and is not intended to convey each and every interaction among the elements shown. A Goal 152 utilizes symbolic information, language information and architecture information in the Goal Directed Debugger 2100 as described in FIG. 2. A Goal 152 receives notification that a state is detected via a primitive event object 154. Primitive events include hitting a logical breakpoint, the completion of an instruction step, the completion of a non sequential flow execution step, as described in upcoming section 6.0 Primitive Events, thread or process creation or termination, and so forth. A goal therefore specifies the states, indicated by 164, for which it wants notification as a list of logical primitive events that it wants to find. The specification of states is shown generically in FIG. 13 as being output by the Goal 152, but may include specifying desired states to some of the elements shown in FIG. 13.

3.4 Primitive services

The Goal Directed Debugger 2100 itself must provide a minimum set of primitive services 156 for use by the goals. For instance, goals need to be able to stop threads or processes, read or write memory or registers, set or remove breakpoints, execute a single instruction (a.k.a., instruction step), etc.

3.5 Logical to Physical Manager

Many goals may, say, need to set a breakpoint at a particular physical address. Conventional computer architectures only allow a singly physical breakpoint to be associated with each unique address. The Logical to Physical Manager 158 is responsible for managing the bidirectional mapping between multiple logical primitive events and a unique physical event.

3.6 Constraint Manager

Goals implement themselves largely without knowledge of other goals. One goal may set a series of logical breakpoints and want to run the program until one of those breakpoints is hit. Another goal may require the program to execute a single instruction. The Constraint Manager 160 is responsible for looking at the total set of implemented goals and determining the least constrained way of running a program which will guarantee the needed recognition of all possible logical events. As described above with respect to optimistic notification, it is possible that this results in false positive reporting of primitive events to a goal, but it guarantees that it will never miss reporting a primitive event.

3.7 State Manager

The Goal Directed Debugger 2100 models each thread and process as a state machine. The Constraint Manager 160 affects the state of threads and processes by requesting that they begin execution. The State Manager 162 also handles the reporting of physical low level events. It is responsible for using the Logical to Physical Manager 158 to get an equivalent set of logical events for each physical event, for notifying goals of interesting logical events, and for transitioning the state machines for threads and processes into non running states, such as exception decode or stopped states.

4.0 GOALS

Goals are implemented via a hierarchy of classes where each class in the tree hierarchy solves a specific subproblem. The methods provided by the base class are described below. First, however, it is important to understand a constructor for a typical low level goal class. The following is the constructor for a goal which solves the problem of executing a program until a specified thread is about to leave the current function that it is executing:

```
TDebuggerAboutToReturnGoal constructor
TDebuggerRunAboutToReturnGoal(TLowAction* adoptedAction,
                              TDebuggerThread* thread);
```

The goal will attempt to stop the thread's execution at a point where the current function's frame is still constructed and as much function context as possible is kept, allowing the user to view the final values of any variables, etc. in the function. Whether or not the goal can actually stop before the frame is destroyed, and which if any data objects will be inspectable at that point is defined by the Compiler. The goal will interpret the Compiler's symbolic information to achieve the stated effect to the best that it can, given the Compiler's instructions.

The constructor takes as parameters a thread indication, which will imply the context in which the goal is to be achieved. In particular, the goal will extract an indication of the function which is currently being executed by the thread, as well as the context in which the function is executing—that is, which function called the current function, which function called that function, etc. This is important as the goal is only achieved if the thread executes some set of instructions in the current function and also in the current context. The adopted action parameter specifies what is to happen when the "about to return" state is detected. Actions are described below in Section 5.0, Actions.

The following shows the four methods defined in the base class of all goals, TDebuggerLowGoal:

```
Goal base class methods
void ImplementGoal( );
bool GoalMet( );
bool DoDeleteOnGoalMet( );
void CancelGoal;
```

4.1 ImplementGoal

Figure 14:
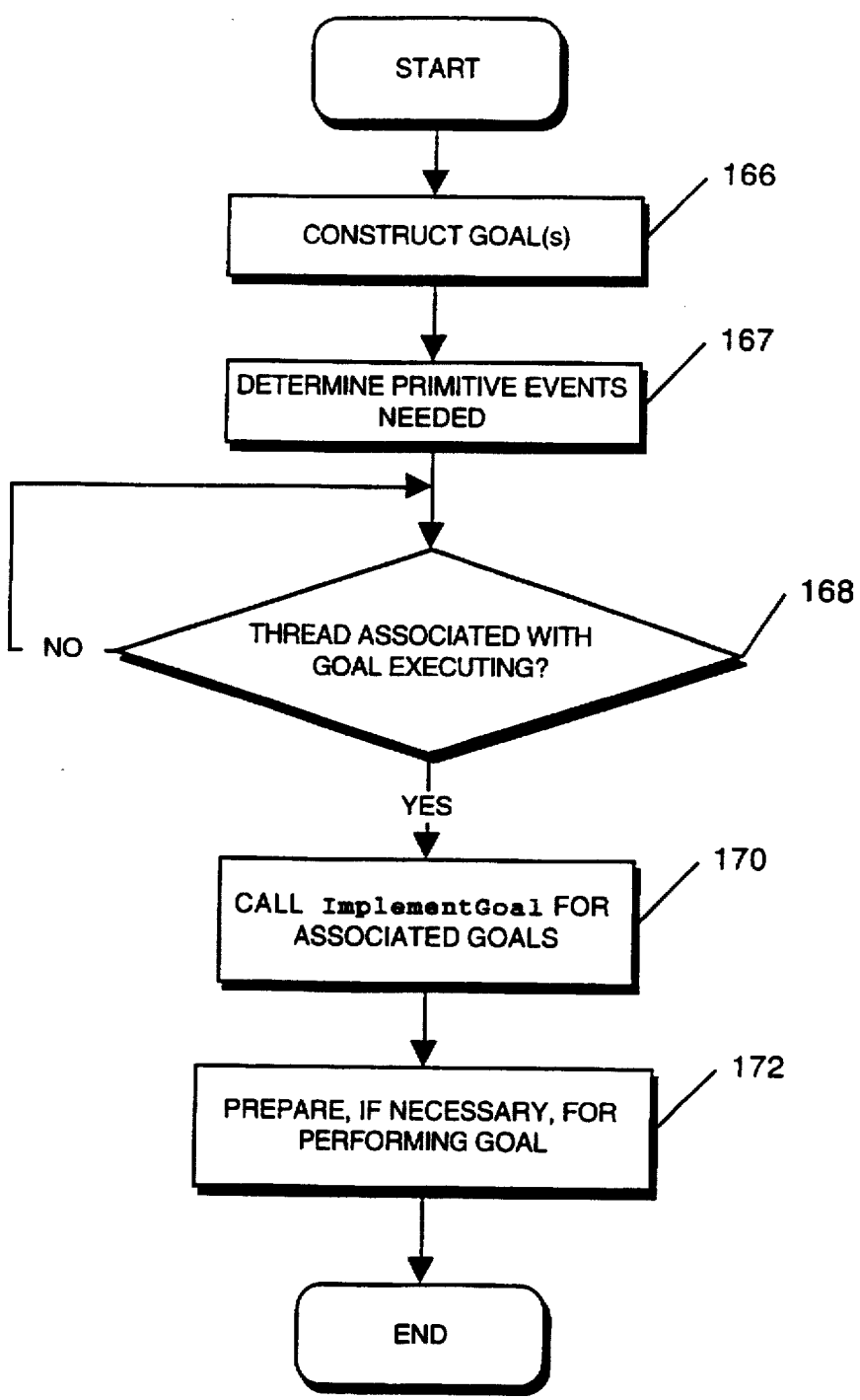
FIG. 14 is a flowchart showing the general system flow of constructing goals, and implementing goals upon reaching a thread which is associated with a goal.

FIG. 14 is a flowchart showing the general system flow of constructing goals, and implementing goals upon reaching a thread which is associated with a goal. When goals are constructed (166), they determine the set of primitive events (167) they will need to detect the program state they need to solve their subproblem. Goals are usually constructed in a particular environment, and so need to determine some required state relative to that environment. They don't actually do anything to detect the required state, however, until the Constraint Manager 160 requests the goal to implement itself (170) when a thread associated with a goal executes (168). At that point, ImplementGoal will be called (see also FIG. 13) and the goal should install any required logical breakpoints, indicate any instruction or non sequential flow stepping it needs, etc.

The Constraint Manager 160 will call ImplementGoal every time it is about to begin execution of a thread which has goals associated with it (170). Each goal must remember if it has already installed any required breakpoints, etc., and not attempt to reinstall them (172).

Goals are allowed to change their implementation over time, so the Constraint Manager 160 must continually ask goals to implement themselves. For instance, a goal could be looking for a sequence of three states in a program. When it finds the first state, it changes itself to look for the second. When it finds the second, it changes itself to look for the third. The Constraint Manager 160 doesn't attempt to keep track of what a goal needs vs. what it has already set up—it requires each goal to keep track of and implement its own needs.

4.2 GoalMet

Figure 15:
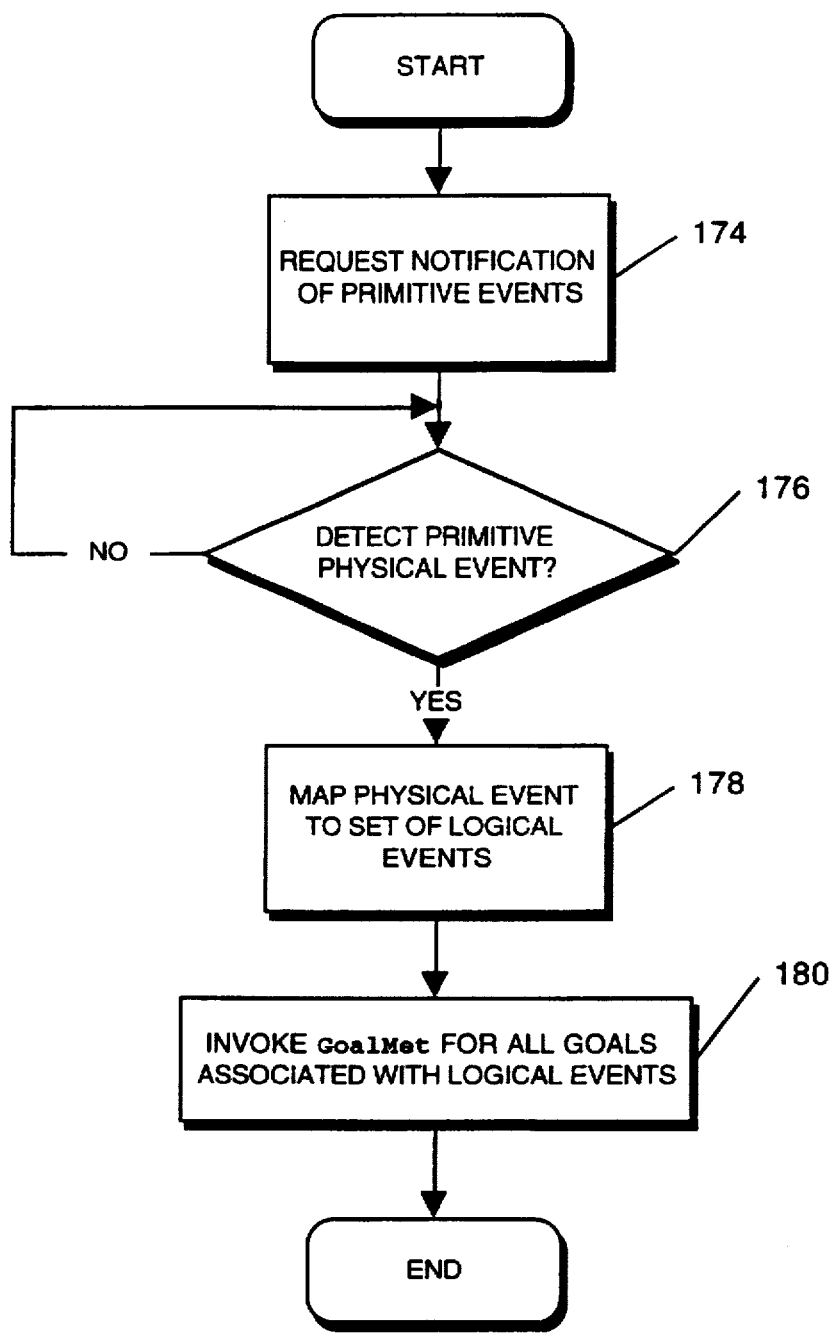
FIG. 15 is a flowchart demonstrating the overall debugger system operations which are performed when detecting and responding to physical event goals being met.

FIG. 15 is a flowchart demonstrating the overall Goal Directed Debugger 2100 operations which are performed when detecting and responding to physical events. When a goal implements itself, it usually requests notification (174) if any of a set of primitive logical events occur, such as one of a set of breakpoints being hit, an instruction step completion, etc. Each time a primitive physical event is detected (176), the State Manager 162 uses the Logical to Physical Manager 158 to map the physical event into a set of logical events (178, and see FIG. 13) and invokes the GoalMet method for the goal associated with each logical event (180). Section 4.3, DoDeleteOnGoalMet, and Section 10.0, State Manager discuss how the result of this method is used.

For any goal object, the GoalMet method is responsible for invoking the action given in the goal's constructor when it determines that it has detected the required program state.

Remember that goals may be given false positive indications. The GoalMet method is responsible for determining if the required program state exists—it must not rely solely on notification of an event as an indication that the required state exists.

4.3 DoDeleteOnGoalMet

Figure 16:
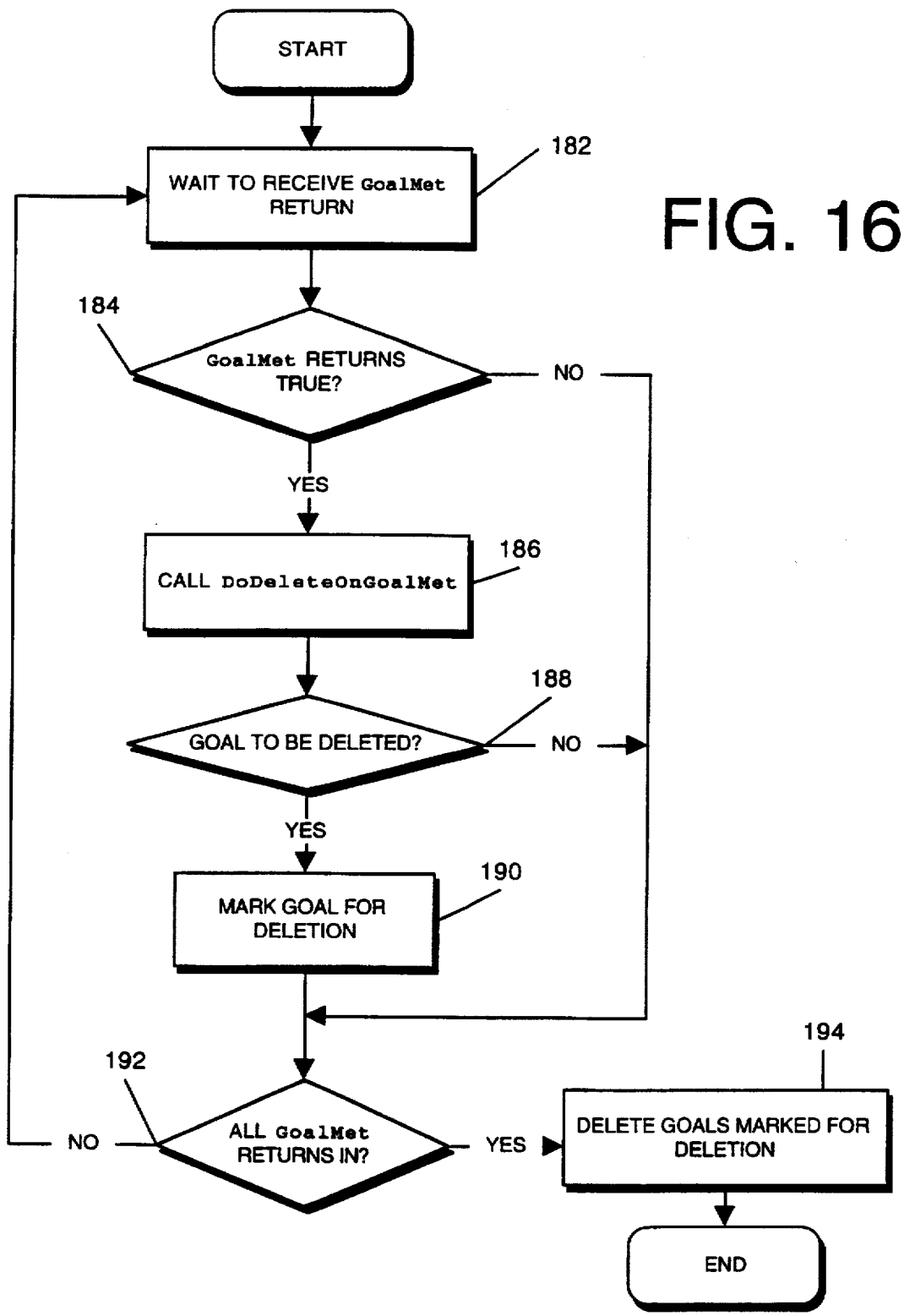
FIG. 16 is a flowchart demonstrating management of goals which are to be deleted upon a goal being met.

FIG. 16 is a flowchart demonstrating management of goals which are to be deleted upon a goal being met. This has been mentioned previously with respect to FIG. 11, where it is shown in phantom that a Goal may be destructed upon completion of a Goal being met. The process begins by waiting for a response to GoalMet (182). If GoalMet returns a true result (184), the State Manager 162 then calls the DoDeleteOnGoalMet method (186). This queries whether or not the goal is to be deleted from the set of goals associated with a primitive logical event, thread, or process (188). Some goals are persistent, like user established breakpoints, which persist until the user explicitly deletes them. Others are to be deleted as soon as the goal is met. If true is returned by DoDeleteOnGoalMet, the goal is marked for deletion (190). After all goals associated with the set of logical events have been notified via the GoalMet call (192), those marked for deletion will be deleted (194), as described in Section 10.0, State Manager.

4.4 CancelGoal

Figure 17:
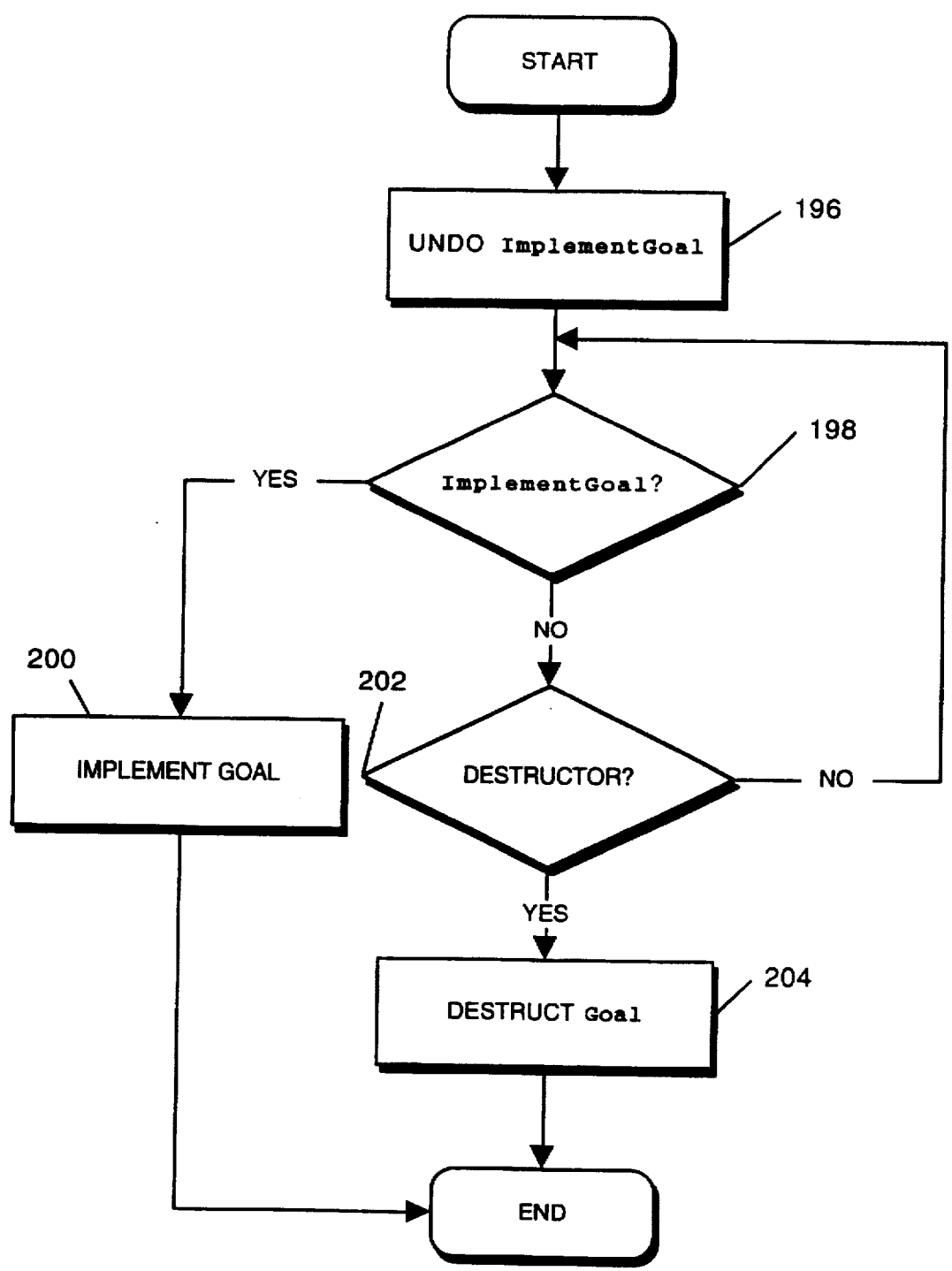
FIG. 17 is a flowchart showing the general debugger system processing performed in response to CancelGoal being called.

FIG. 17 is a flowchart showing the general Goal Directed Debugger 2100 processing performed in response to CancelGoal being called. Goals must be implemented so that they can be canceled at any time. A user might cancel a goal. Also, as goals can use other goals to solve subproblems for them, a goal might install several subgoals and when one of them succeeds, the original goal might then cancel the remaining subgoals. When CancelGoal is invoked, a goal is responsible for removing any associated primitive logical events—that is, it must undo whatever it did in the ImplementGoal call (196). A goal must not assume that a CancelGoal call will be followed by deleting the goal. In that respect, CancelGoal is similar to a suspend-goal call. A CancelGoal might be followed by an ImplementGoal call (198) to cause the goal to be reimplemented (200), so it must keep any context required to reimplement the goal. Only the goal destructor is allowed to dispose of context required to implement a goal (202, 204). In general, after a goal is canceled it waits to either be re-Implemented or Destructed.

5.0 ACTIONS

Figure 18:
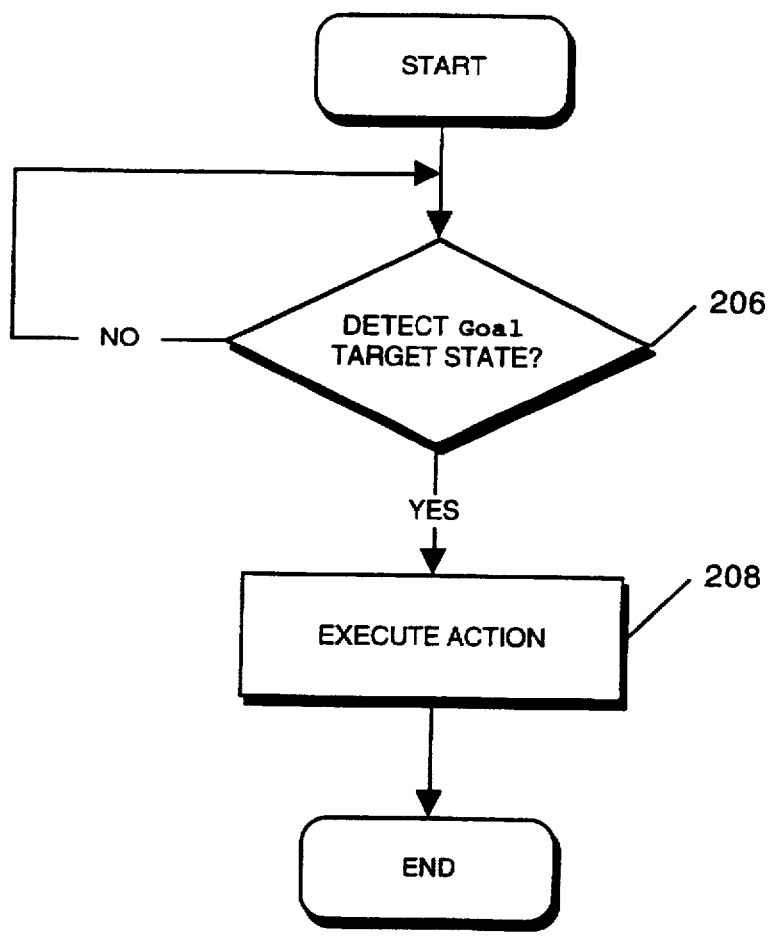
FIG. 18 is a flowchart showing the general system processing of an action in response to detection of a target state of a goal.

FIG. 18 is a flowchart showing the general system processing of an action in response to detection of a target state of a goal. Actions are implemented via a hierarchy of classes where each leaf class in the tree hierarchy performs a specific series of actions. There is only one interesting method in the base class TLowAction, namely Execute:

Execute
void Execute(TDebuggerThread* currentThread);

Execute is responsible for carrying out whatever actions are to be taken (208) in response to a goal's target state being detected (206). Execute can do something simple, like stop a thread or process, or something elaborate, like modify a goal, create other goals, write information to log files, or make use of any service supplied by the Goal Directed Debugger 2100.

While TLowAction is a language, processor, OS, etc. neutral base class, concrete action classes are usually specific to some aspect of the target environment. For instance, one commonly built-in action provides a "stop current thread" service. The following shows the constructor for one such concrete class which implements stopping a thread on a PowerPC processor:

TPowerPCLowActionStop
TPowerPCLowActionStop( );

The constructor needs no parameters, as the thread to stop will be supplied as a parameter in the Execute call.

As you might infer from the description in Section 10.0, State Manager, the TPowerPCLowActionStop method merely sets the thread specific run_thread variable to false, which will cause the State Manager 162 to transition a thread into the stopped state.

6.0 PRIMITIVE EVENTS

Figure 19:
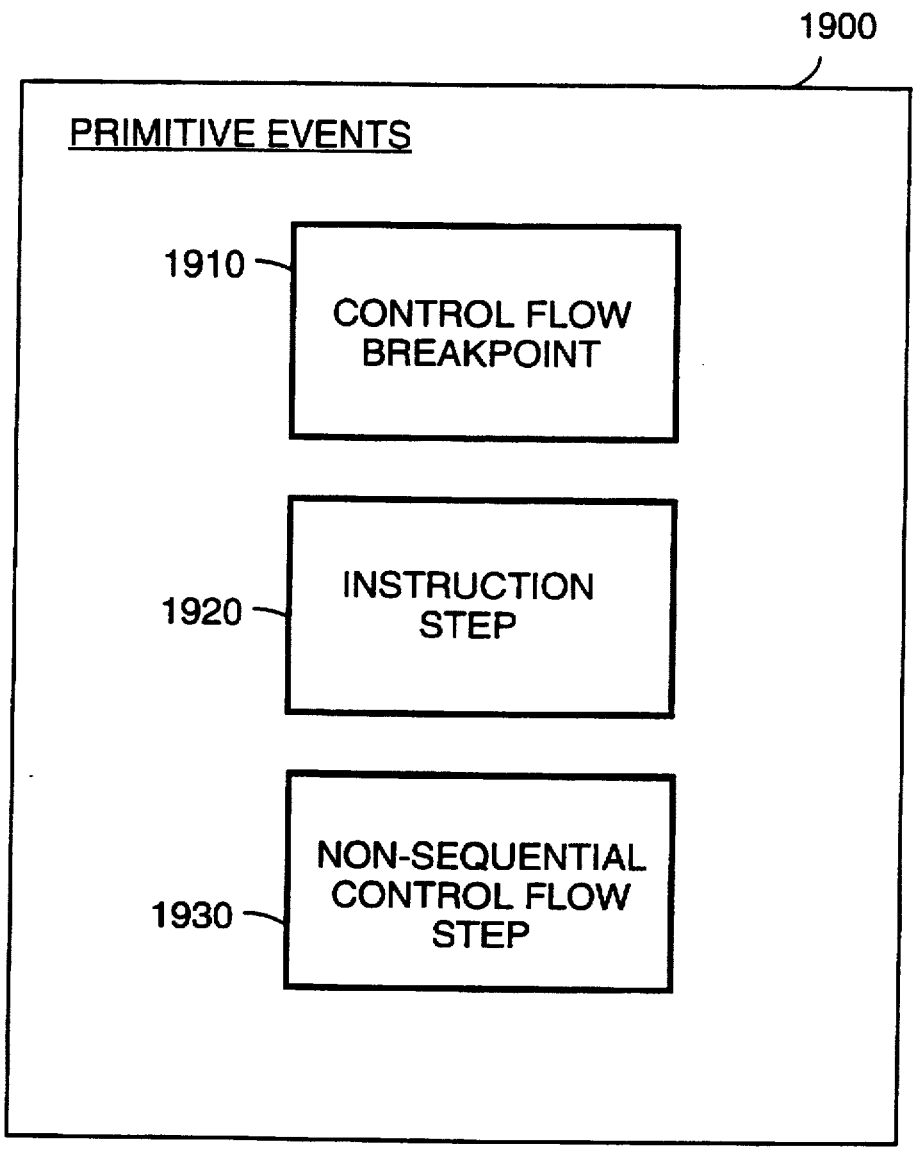
FIG. 19 is a figure conveying use of primitive events.

FIG. 19 illustrates a set of primitive events 1900 utilized by the Goal Directed Debugger 2100 in accordance with a preferred embodiment. Control flow breakpoints 1910 are classic breakpoints which force a thread or process to halt and debugger notification when a particular instruction is about to be executed. Instruction step 1920 causes debugger notification to occur after exactly one instruction is executed in a thread or process. Non-sequential control flow step 1930 causes debugger notification to occur after an instruction is executed which potentially causes the control flow to transfer to other than the next sequential instruction as described below. The Goal Directed Debugger architecture relies on a small, known set of primitive services. In particular, goals need to be able to set breakpoints, step over the execution of a single instruction, run a program until either a breakpoint is hit or until a non sequential instruction is executed, and get notification of a small set of interesting runtime events, such as process and thread creation and destruction. In fact, the interesting runtime events are often detected by implicit breakpoints set in runtime libraries. It is also contemplated that the runtime system could actively cooperate with the Goal Directed Debugger 2100, providing notification of the needed run-time events. Either way, the Goal Directed Debugger 2100 knows about a small set of interesting runtime events, such as throwing a software exception, propagating exceptions, process termination, etc.

Goals only know about logical events. For instance, three different goals may want to cause a program to step over one instruction. Each goal would indicate, by creation of a logical instruction step event, that it wants notification of an instruction step complete state in the target program. When that one physical event occurs, the three goals will all get notification of their individual logical events. Or, three goals could set a breakpoint at a single physical location for three different reasons. Again, when the single physical event occurs, each goal will be notified of its logical event taking place.

For logical events which can be explicitly created, there is a TLowEventID class object which can be created. A possible constructor might be:

TLowEventID
TLowEventID(TDebuggerThread*      thread,
            const bool            isInstructionStep,
            const bool            isNonSequentialFlowStep,
            const bool            isBreakpointEvent,
            TBreakpoint*          breakpoint,
            TDebuggerLowGoal*     lowGoal);

It shows that there are three possible interesting kinds of low event: an instruction step event, a non sequential flow event, and a breakpoint event. There may also be a set of predefined logical event constructors corresponding to the runtime events discussed above.

A thread context must be supplied for every kind of TLowEventID object which qualifies in which thread the implied state is to be detected. There are predefined TDebuggerThread objects which can denote all threads in a particular process, or all threads in any process. Each TLowEventID object must also be associated with a goal, which is also provided as a parameter to the constructor. For instruction step and non sequential flow step events, no additional information is needed to construct the TLowEventID object. For breakpoint events, however, a breakpoint object of type TBreakpoint must also be associated.

A TBreakpoint object might be constructed as follows:

```
TBreakpoint
  TBreakpoint(TDebuggerThread*           thread,
              TDebuggerLowGoal*          lowGoal,
              TBreakpointTable*          container,
              TLowEventID*               lowLevelEventID,
              const TDebuggerAddress&    address,
              const bool                 enabled,
              const BreakType breakType = kTemporaryBreak);
```

As with TLowEventID objects, a TBreakpoint object must be associated with a thread and a goal. They must also always be associated with a TLowEventID object. Using this sample code, it is not possible to sequentially construct a TLowEventID object and give it a reference to a TBreakpoint object, and also create a TBreakpoint object and give it a reference to a TLowaventID object. One or the other object will not exist when the other object is created. To solve this, both classes allow passing an empty reference to the other object during their construction and correcting the reference after both have been constructed.

A breakpoint must also be associated with an address, and a kind of breakpoint, such as an unconditional, conditional, temporary, etc. kind. In this implementation, it's also possible to specify whether or not the breakpoint is to be implemented or enabled at the time of construction. Finally, breakpoints are collected together in a pool indicated by a TBreakpointTable object. The pool is used in logical to physical bidirectional mapping.

It is important to note at this point the possibly unfamiliar "non sequential flow" event. There are many types of actions the Goal Directed Debugger 2100 may wish to take where it wants to stop at some definite future execution point. For instance, a request to step to the next statement in a program requires that the Goal Directed Debugger 2100 be able to stop at all possible next statements. This might be achieved by stepping a program an instruction at a time and testing to see if the next statement is reached, but that would be very inefficient. A better solution would be to set breakpoints at all possible next statements and execute until one of them is hit.

In many languages, it is not possible to statically determine all possible next statements. For instance, an expression in the current statement involving a function call may derive an object, and that object may itself be used to invoke a virtual function call. Since the Goal Directed Debugger 2100 can't determine ahead of time the object that will result from executing the expression, without itself interpreting the expression, it cannot know what is the next function that will be executed, and therefore the next statement that will be executed.

So, one of the possible program states that the Goal Directed Debugger 2100 needs to detect is if a running program hits a breakpoint, or executes a non sequential flow instruction. The non sequential flow piece of this means that if a jump, branch, branch to subroutine, or other such instruction which potentially causes an instruction to be executed which is not the instruction following the currently executing instruction, then the Goal Directed Debugger 2100 gets notification and control of the target program after the jump, branch, etc. has completed execution. Note that if the jump, branch, etc. in fact causes the instruction following the jump, branch, etc. to be executed, that doesn't matter. The fact that an instruction could cause a non sequential instruction to be executed triggers the event. Synchronous and asynchronous exceptions, such as divide by zero, or arithmetic overflow exceptions, need not work this way. The Goal Directed Debugger 2100 will typically detect these conditions by setting a breakpoint in the appropriate exception handler, or in some other way get the proper notification of the exception event. The Motorola 68000 family of products provides non-sequential flow primitive event processing in hardware.

7.0 PRIMITIVE SERVICES

As described above with respect to FIG. 2, a Goal Directed Debugger 2100 is typically organized as a network of services, such as a Symbolic Information Database 2112, a Logic Engine 2110, a Tool Interface 2113, a language specific set of services, an architecture specific set of services, etc. One such component is a set of primitive Target Program Control Services. This service provides all the common target control services upon which all the other debugger services or components depend. Such services typically include, among others:

Start a new process or attach to a running process.

Kill a thread or process.

Detect process and thread creations and terminations.

Read and write memory and registers.

Suspend and restart a set of threads and processes.

Set and clear breakpoints.

Execute a single instruction in a thread.

Execute a thread until a breakpoint is hit or a non sequential flow occurs.

Determine the state of resources associated with threads and processes.

Detect, cause, and manage exceptions in threads and processes.

A common architecture for debuggers today is to group services of the debugger into groups such as:

A group which is independent of architecture and language dependencies.

A group which provides architecture specific services.

A group which provides language specific services.

A group which provides primitive services.

The Goal Directed Debugger 2100 simultaneously debugs a combination of programs which are running on different architecture processors, and the programs contain components of mixed computer languages, and the programs are running on remote and local processors. With that in mind, the primitive services can be usefully divided into two components: one which provides an abstraction of services and which runs on the same processor as the bulk of the Goal Directed Debugger 2100 tool, and one which provides a concrete instance of those services and which runs on the same processor as one of the programs being debugged.

8.0 LOGICAL TO PHYSICAL MANAGER

Figure 20:
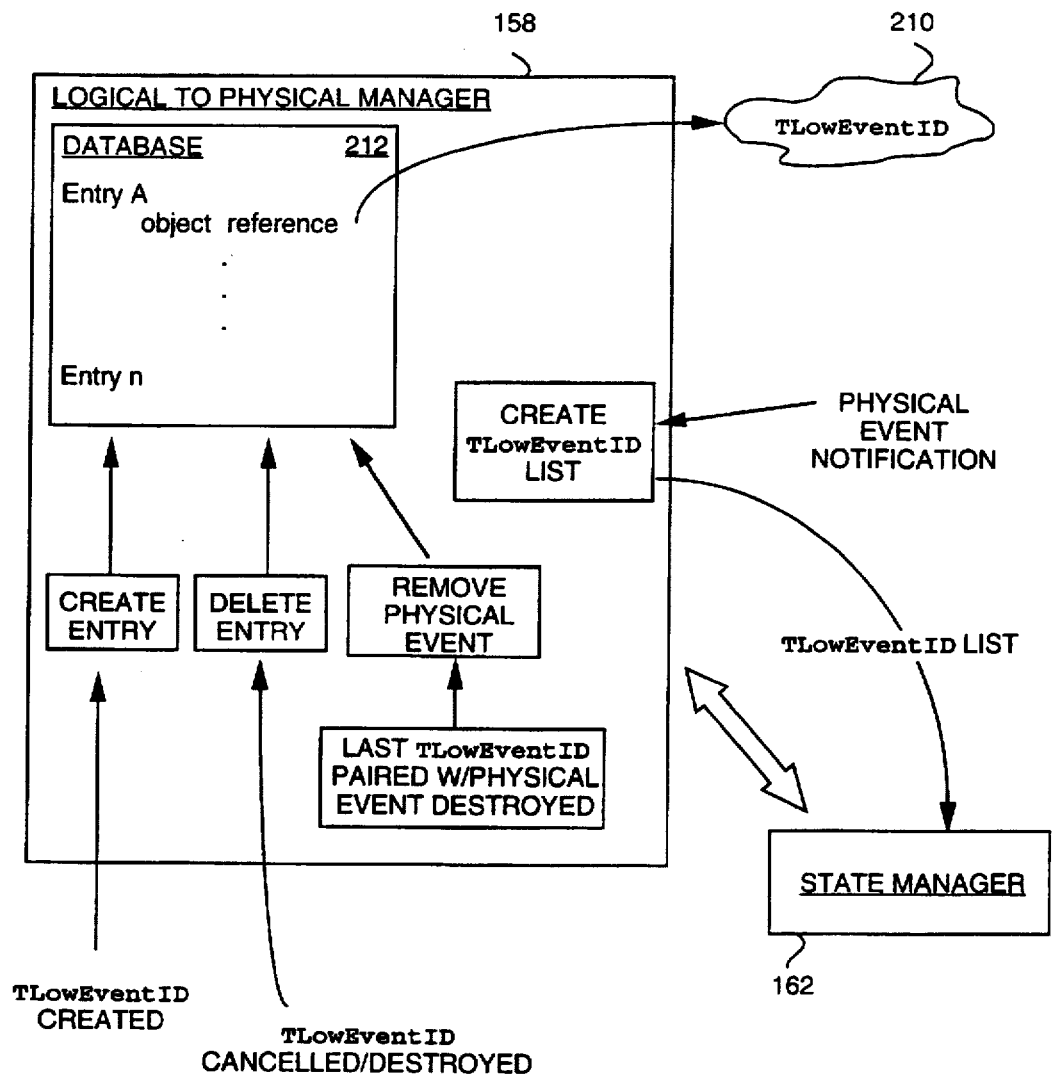
FIG. 20 is a block flow diagram showing some of the components and operations of the Logical to Physical Manager.
Figure 21:
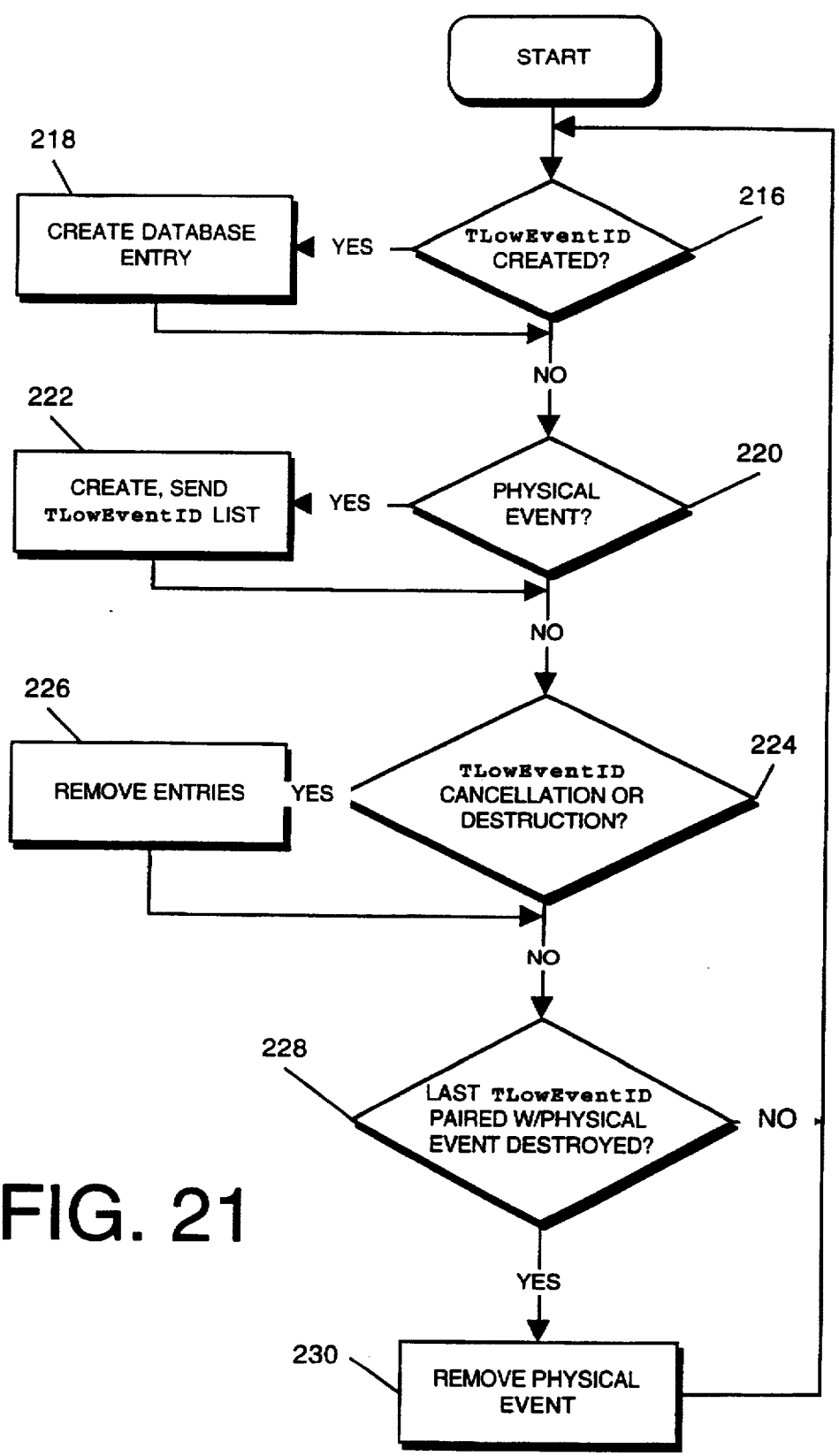
FIG. 21 is a flowchart showing some of the operations of the Logical to Physical Manager.

FIG. 20 is a block flow diagram showing some of the components and operations of the Logical to Physical Manager 158. FIG. 21 is a flowchart showing some of the operations of the Logical to Physical Manager 158. It should be noted that FIG. 21 is merely representative of operations performed by the Logical to Physical Manager 158, and should not be considered limiting. That is, the operations are not necessarily performed in the order shown, and the diamond decision blocks are merely representative of the Manager 158 responding in some way, as shown in FIG. 20. The Logical to Physical Manager 158 does not necessarily make any of the determinations shown, but may. The notification of creation, physical events, cancellation, destruction, may occur at any time in any order, and the Manager 158 may be apprised of such activities in a variety of ways.

It should also be kept in mind that FIG. 21 is merely illustrative of the overall processing existence of the Logical to Physical Manager 158, and therefore does not show an "END" block as is typical in program flowcharting. This should be understood to convey that the Logical to Physical Manager 158 performs the functions described as long as it is running properly.

As described several times above, particularly in Section 6.0. Primitive Events, there is a need to map physical and logical events to each other. This service is performed by the Logical to Physical Manager 158. Whenever a TLowEventID object 210 is created (216) the Logical to Physical Manager 158 creates in its database 212 an entry which indicates the TLowEventID logical event object, and the required physical event object which is equivalent to the logical event (218), as shown in FIGS. 20 and 21. For instance, if three TLowEventID objects all were to set a breakpoint at a single physical address, the manager's data base would have three entries. Each entry would have a reference to one of the TlowEventID objects and a reference to a single physical breakpoint event object for that one physical address.

When a physical event occurs (220), such as hitting the single physical breakpoint in the example above, the Logical to Physical Manager 158 creates a list of all TLowEventID objects which correspond to the single physical breakpoint and passes that list (222) to the State Manager 162, as described in Section 10.0. The goal destroys all TLowEventID objects that it created. As part of that destruction (224), the Logical to Physical Manager 158 will remove all entries in its database which reference those TLowEventID objects (226). When the last TLowEventID which is paired to a physical event is destroyed (228), the Logical to Physical Manager 158 removes the physical event as well (230).

So, if two different goals require a logical breakpoint at the same physical address, they create two TLowEventID objects but only a single physical breakpoint is created. When that physical breakpoint is hit, a list of the two TLowEventID objects is passed to the State Manager 162. When one of those goals is destructed or canceled, the physical breakpoint remains in effect since there is still a logical breakpoint which requires the physical breakpoint. When the last of those two goals is destructed or canceled, the physical breakpoint is finally removed.

9.0 CONSTRAINT MANAGER

Figure 22:
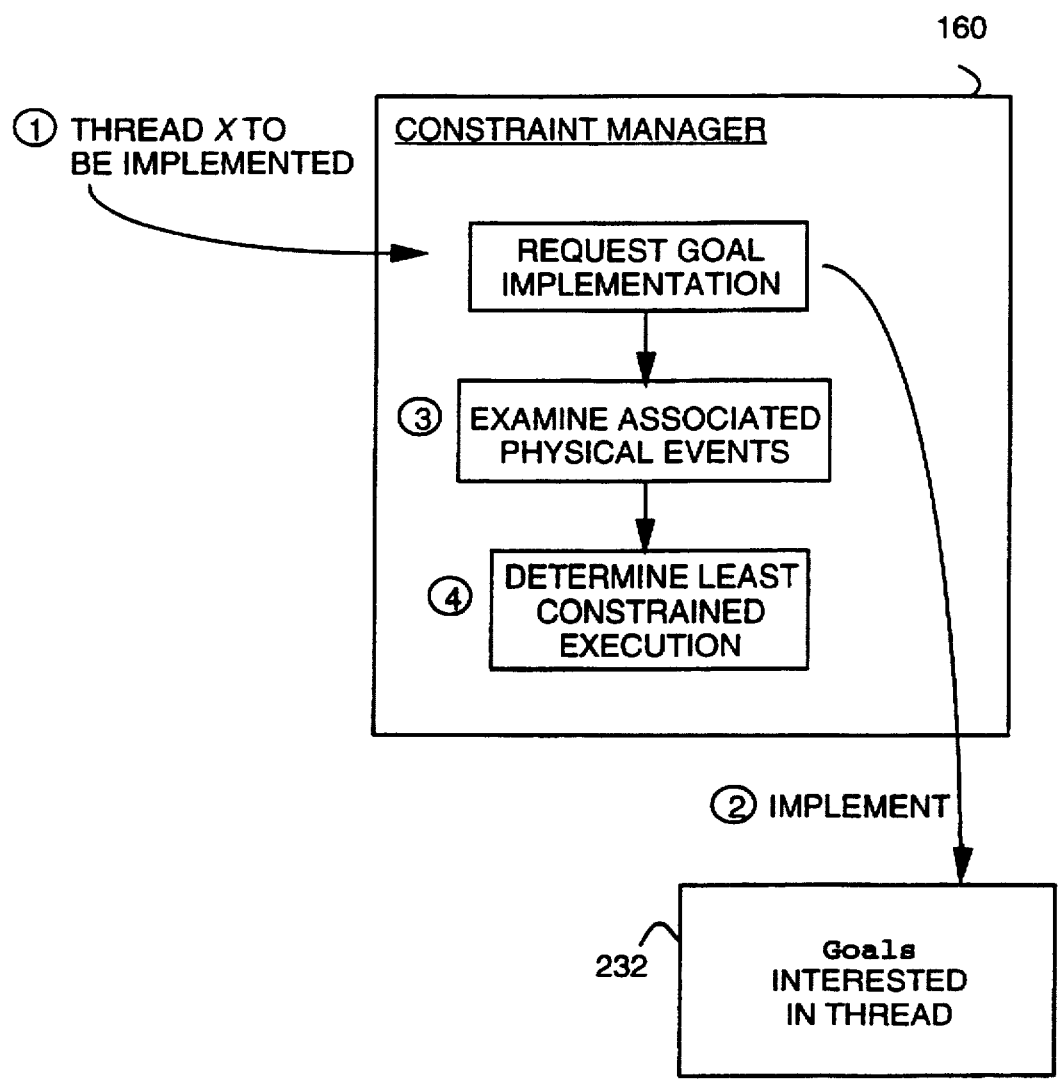
FIG. 22 is a block diagram showing the general elements and flow of operations of the constraint manager with respect to execution of a thread.

FIG. 22 is a block diagram showing the general elements and flow of operations of the constraint manager with respect to execution of a thread. When a thread is directed to execute by the Goal Directed Debugger 2100, indicated by step 1, the Constraint Manager 160 comes into play. Its role is to examine all the physical events associated with the thread, indicated by step 3, and to find the least constrained way to execute the thread such that the guarantee of no missed events is achieved, as indicated by step 4. This has been addressed briefly above with respect to optimistic notification.

The first thing the Constraint Manager 160 does, as indicated by step 2 in FIG. 22 is to ask all goals which might be interested in the thread 232 to implement themselves. This is to make sure that it has an accurate picture of all the physical events required for the thread. From then on, the process is simple. There are basically three kinds of physical events which must be detected: breakpoints, instruction steps, and non sequential flow events.

An instruction step is the most constrained way to execute a thread. If a goal requires a non sequential flow event, then notifying a goal that the non sequential event may have occurred after each instruction will surely meet that requirement. If a goal requires a breakpoint event, then notifying a goal that the breakpoint may have been hit after each instruction will surely meet that requirement. Again, it's important to remember that a goal may get false positive notification of desired events. A goal may want to know when a non sequential flow has occurred, but the only guarantee the goal gets is that it will be notified at least in that situation, but it may be notified in other situations as well. As described earlier, its up to a goal to determine if its goal state is detected when it gets notification.

So, if any goal wants an instruction step event, the Constraint Manager 160 enables instruction step event detection and executes the thread. The next least constrained way to execute a thread is with non sequential flow event detection enabled. If no instruction step event detection is needed, but non sequential flow event detection is needed, the Constraint Manager 160 enables the non sequential flow event detection and executes the thread. Breakpoints, in conventional architectures, requires no special action by the Constraint Manager 160. Breakpoints would have been inserted into the program when goals needing them implemented themselves. So, if no instruction step or non sequential flow events need to be detected, the Constraint Manager 160 merely executes the thread.

This guarantees that all events required by goals will be detected. When one of those events is detected, the State Manager 162 takes over.

10.0 STATE MANAGER

Figure 23:
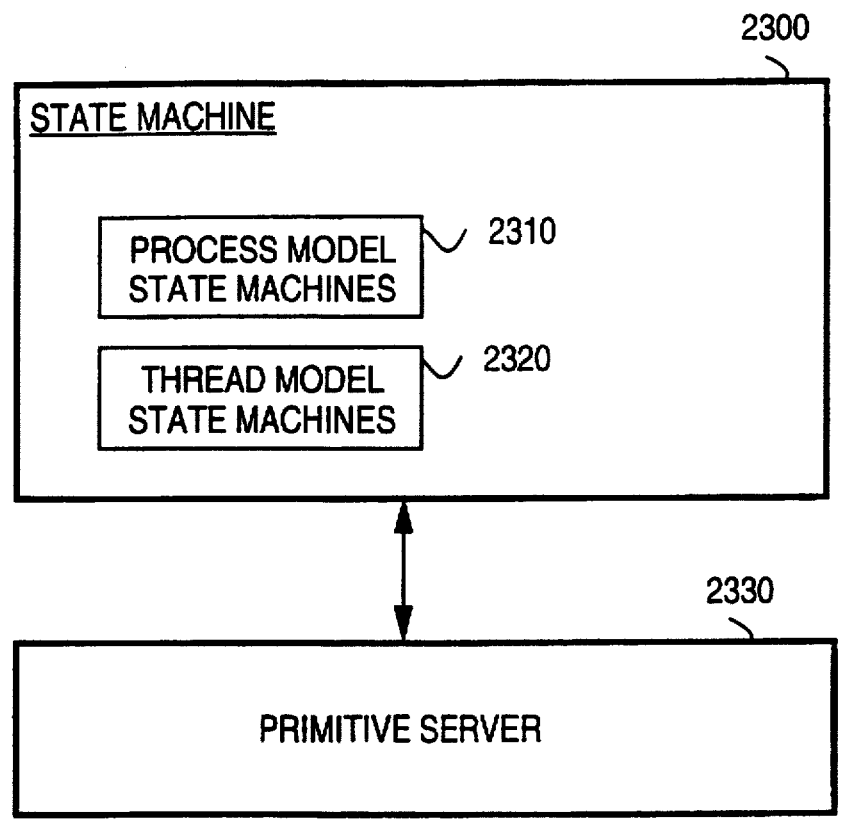
FIG. 23 is a block diagram showing the main components and information flows of the State Manager.

FIG. 23 is a block diagram showing the main components and information flows of the State Manager 162. Processes 2310 and threads 2320 in the debugger 2300 are modelled as state machines. Processes and threads begin in a start state and transition to a stopped or running state upon notification of primitive events by the primitive server 2330. When a thread causes a physical event, such as hitting a breakpoint or completing an instruction step, it transitions to an exception-decode state. A running thread may also be explicitly asked to suspend its execution, in which case it enters a suspended state. From the exception-decode state or the suspended state, the thread normally transitions to the stopped state or the running state, depending on some action by the Debugger Engine. The technology of the State Manager 162 facilitates the use of state machine modelling.

Figure 24:
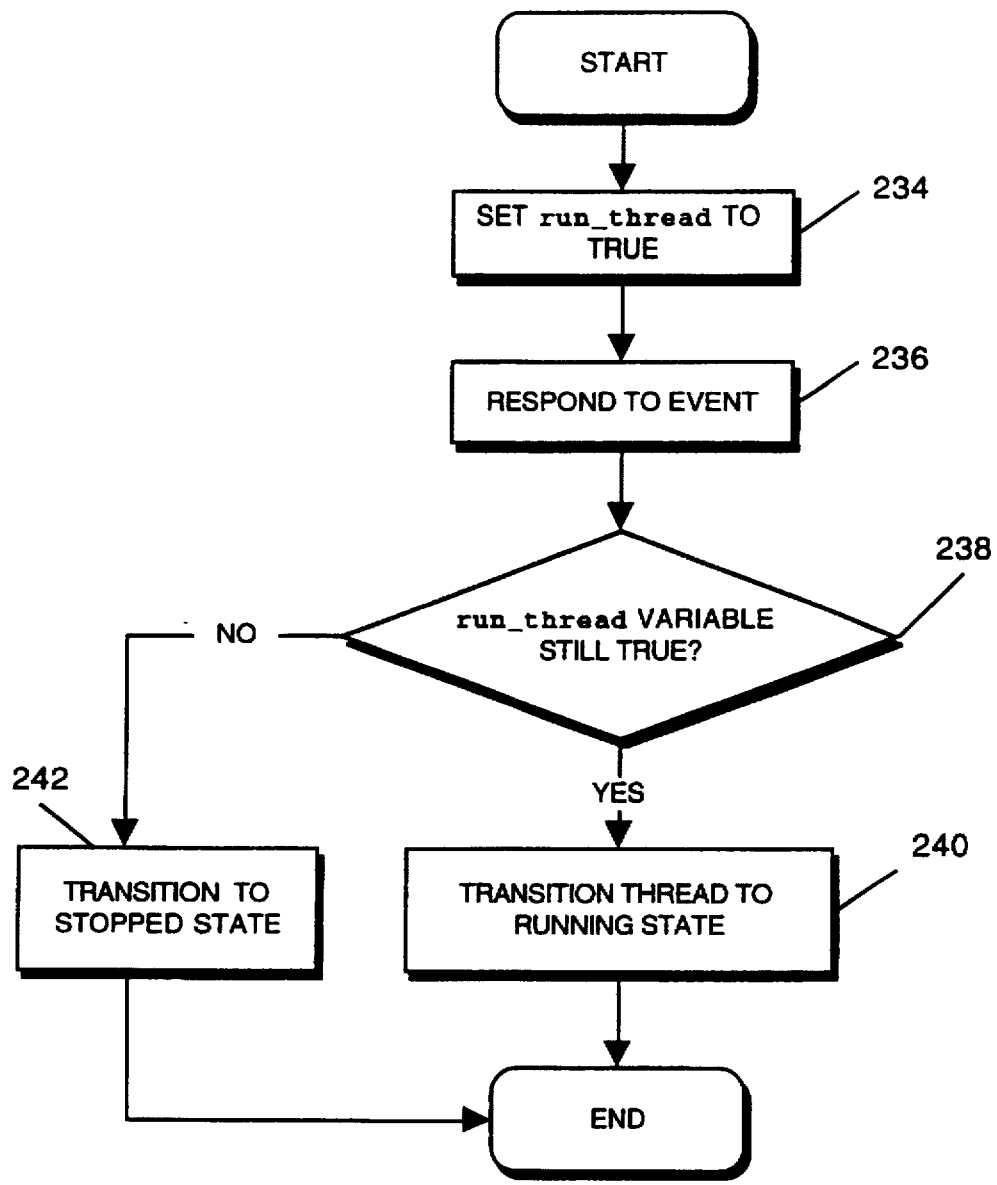
FIG. 24 is a flowchart showing how the exception-decode state is handled.
Figure 25:
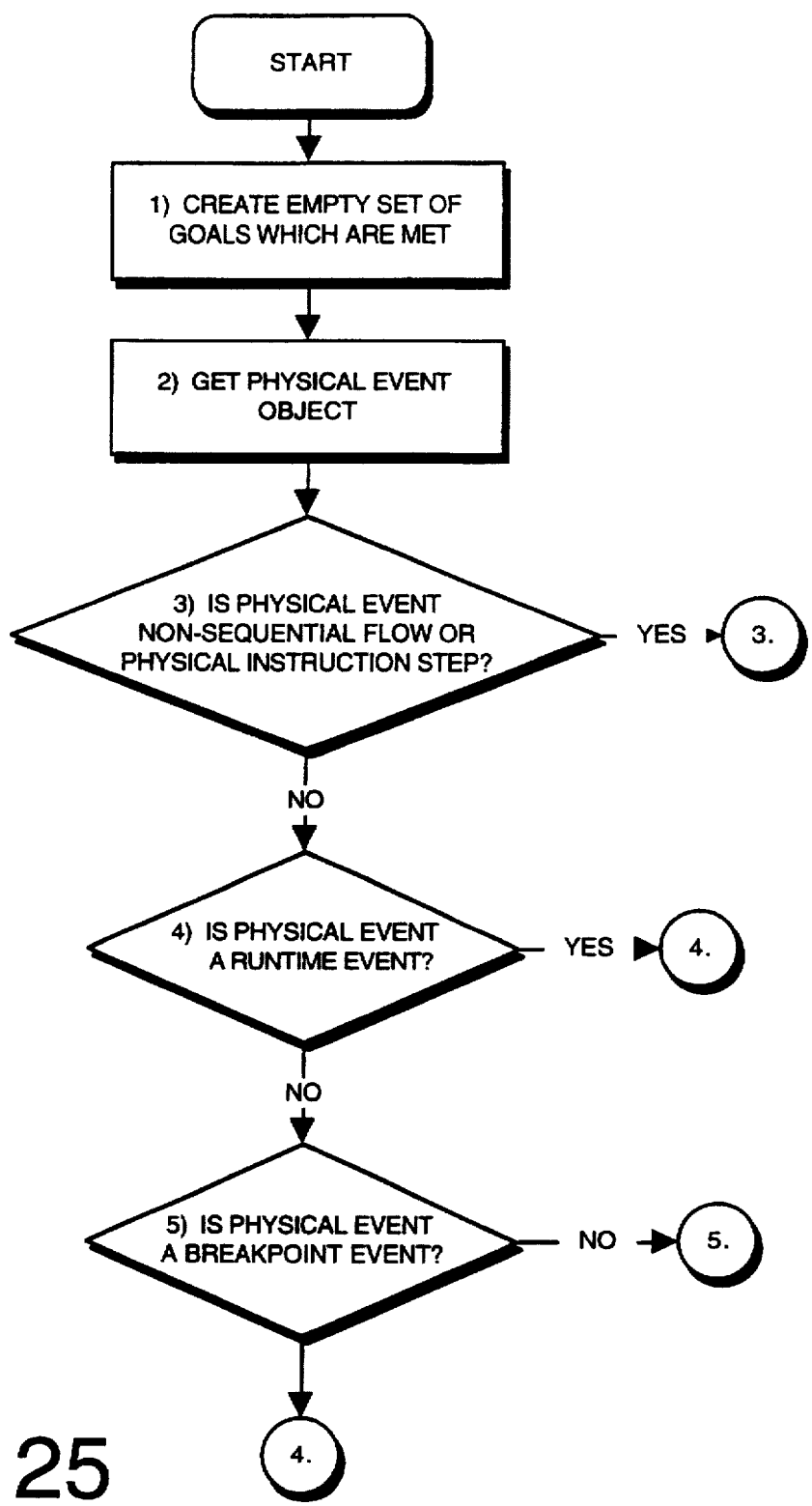
FIGS. 25, 26, 27, 28, and 29 are flowcharts showing the response processing of the State Manager.
Figure 26:
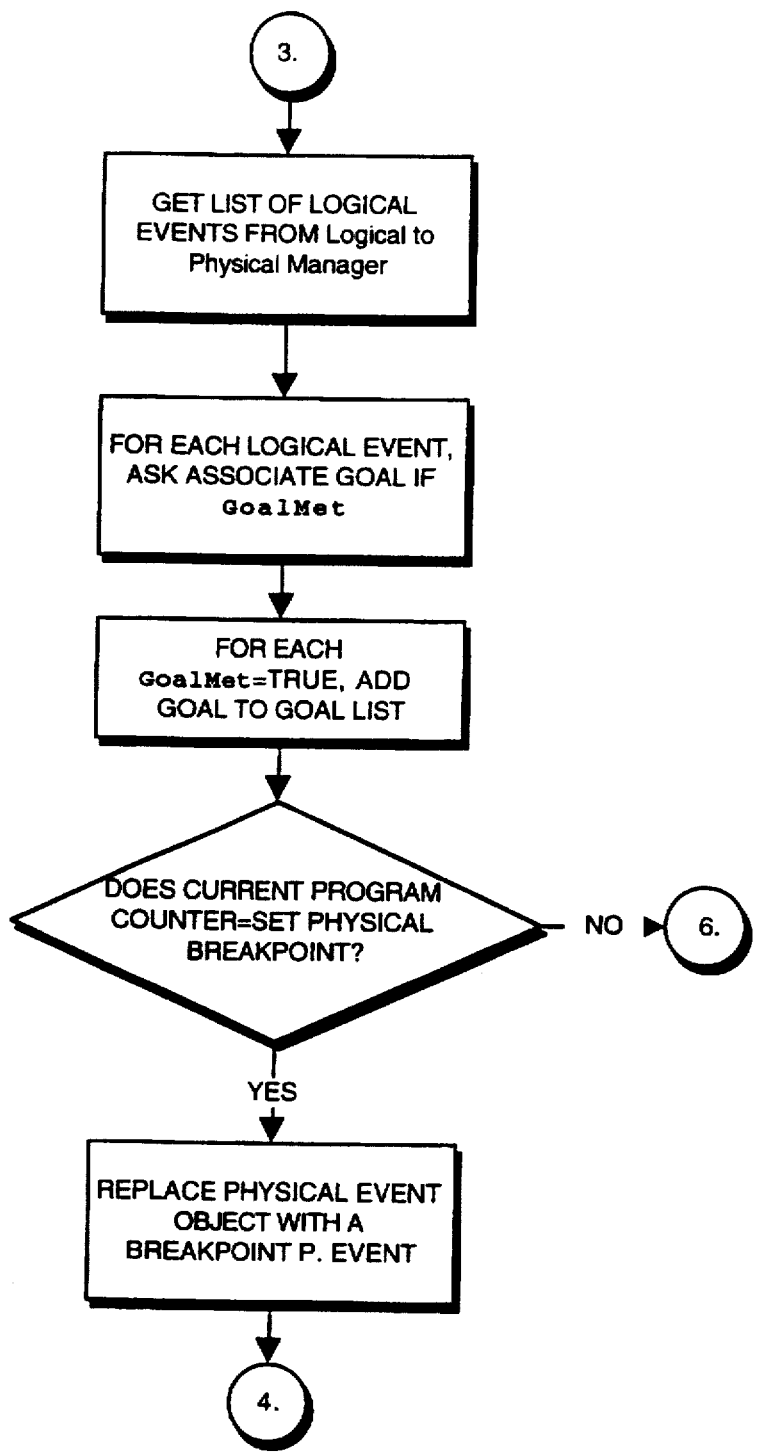
Figure 27:
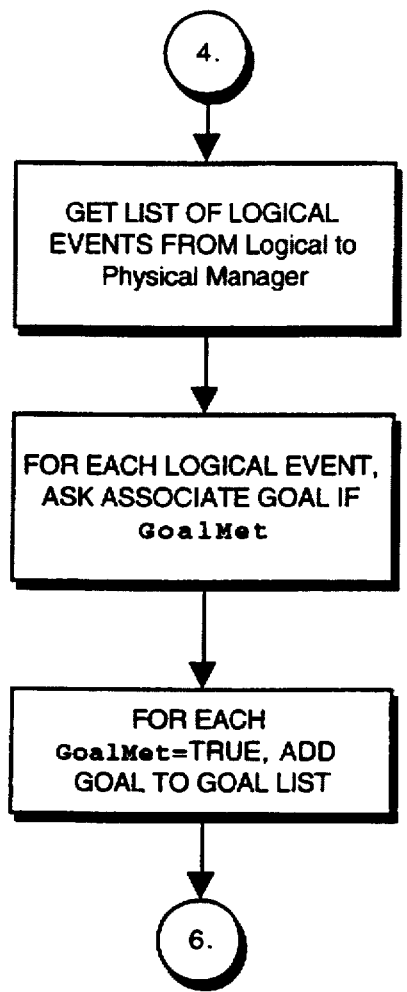
Figure 28:
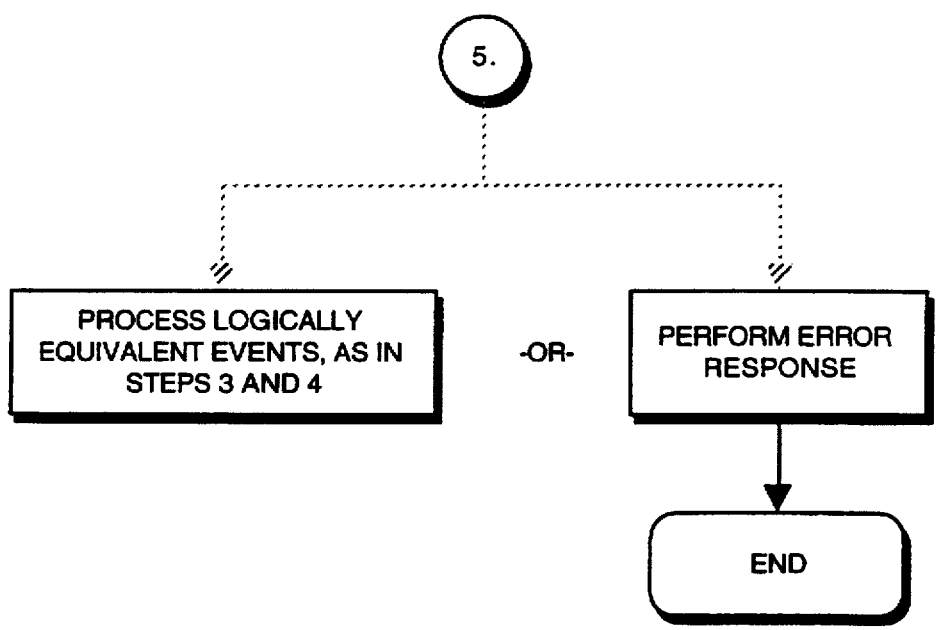
Figure 29:
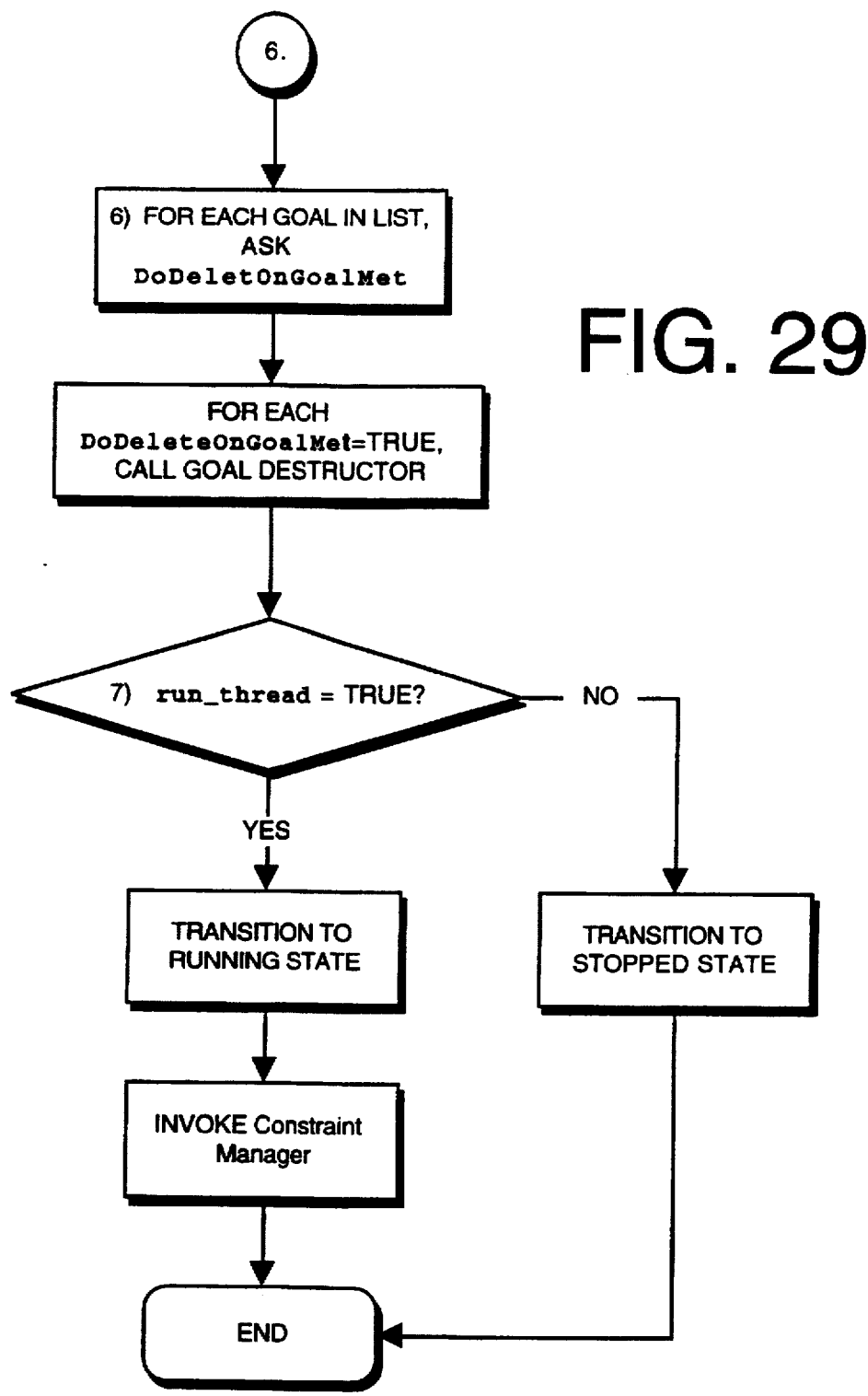

FIG. 24 is a flowchart showing how the exception-decode state is handled. The following is a description of the processing that takes place in the exception-decode state, as associated with goal directed debugging. When a thread transitions to the exception-decode state, the primitive services component of the debugger has at least temporarily halted execution of the thread. A variable associated with the thread, call it "run_thread," is set to true (234). The State Manager 162 is going to respond to the event (see discussion below) which caused the exception-decode state to be entered (236). If, after the response is complete, the run_thread variable is still true (238), the State Manager 162 will transition the thread to the running state (240). Any transition to the running state will cause the Constraint Manager 160 to compute the least constrained way to execute the thread and begin its execution (not shown). If, however, the run_thread variable is false, the State Manager 162 will transition to the stopped state (242) and the thread will remain stopped until some further Debugger Engine action causes it to transition to the running state again.

FIGS. 25, 26, 27, 28, and 29 are flowcharts showing the response processing of the State Manager 162. The response processing just alluded to works as follows, with a few details omitted which are not necessary to the understanding of the State Manager 162:

1) An empty set of goals which are met is created.
2) Get the physical event object.
3) If the physical event is a non sequential flow or an instruction step event, get the list of logical events corresponding to both a physical instruction step event and a physical non sequential flow event from the Logical to Physical Manager 158. For each logical event in the list, ask the associated goal if GoalMet, as described in Section 4.2. If GoalMet returns true, add the goal to the list from step 1. If the current program counter corresponds to a physical breakpoint event that was set, replace the physical event object with a breakpoint physical event object and proceed to step 4. This last step is needed to process all logical events which correspond to the program being in the current state. If, for instance, we stepped over one instruction and a breakpoint is set for the next instruction which follows, we want to consider that the breakpoint event has occurred as well as the instruction step event. If no breakpoint corresponds to the current program counter value, go to step 6.
4) If the physical event was a "runtime" event, such as a software exception being thrown or a hardware exception occurring, ask the Logical to Physical Manager 158 for the list of logical events associated with the physical event. For each logical event in the list, ask the associated goal if GoalMet, as described in Section 4.2. If GoalMet returns true, add the goal to the list from step 1. Go to step 6.
5) If the physical event is not a breakpoint event, some unusual event has occurred or some class of event not described has occurred. Either process the list of logically equivalent events, as described in steps 3 and 4 above and go to step 6, or perform some error response.
6) For each goal in the set from step 1, ask the goal DoDeleteOnGoalMet, as described in Section 4.3. If DoDeleteOnGoalMet returns true, call the destructor for the goal. Each goal's destructor will de-implement the goal, destructing any TLowEventID objects associated with it.
7) If run__thread is true, transition to the running state and invoke the Constraint Manager 160, else transition to the stopped state.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is as follows:

1. An apparatus for goal directed debugging of an application program, the apparatus comprising:
(a) a user interface for receiving a request from a user for information concerning a cause of a observed problem in the application program;
(b) a goal developer for receiving the request and breaking the request down into one or more debugging goals, which, when accomplished, will provide information concerning the cause of the problem;
(c) a debug program control element responsive to the one or more debugging goals for selectively executing one or more debugging programs to accomplish each of the one or more debugging goals; and
(d) a reporting element for collecting information from the application program executing under control of the one or more debugging programs, determining a cause of the problem from the information and reporting the information to the user.

2. The apparatus for goal directed debugging of an application program according to claim 1, further comprising a context assessor for assessing a context of the application program at various points in its operation, wherein the goal developer utilizes the context of the application program to develop the one or more debugging goals based on the request.

3. The apparatus for goal directed debugging of an application program according to claim 1, wherein the goal developer comprises a debug hypothesis developer for developing one or more debug hypotheses based on the request regarding a failure which resulted in the problem.

4. The apparatus for goal directed debugging of an application program according to claim 3, wherein the debug hypothesis developer, utilizes program execution information from the application program executing under control of the debugging programs to modify one or more of the debug hypotheses to more accurately determine the failure.

5. The apparatus for goal directed debugging of an application program according to claim 1, wherein the goal developer comprises a backtrack hypothesis developer for developing one or more backtrack hypotheses which indicate the cause of the failure in response to a first of the debug hypotheses being determined as correctly indicating the failure.

6. The apparatus for goal directed debugging of an application program according to claim 1, wherein the goal developer tests the one or more backtrack hypotheses and generates a backtrack trail of the test results.

7. The apparatus for goal directed debugging of an application program according to claim 1, wherein the goal developer comprises a subgoal developer for developing one or more subgoals to implement the one or more goals; and
wherein the program control element selectively executes the one or more debugging programs based on the at least one or more subgoals.

8. The apparatus for goal directed debugging of an application program according to claim 1, further comprising a target program interpretation element for interpreting the application program.

9. The apparatus for goal directed debugging of an application program according to claim 1, wherein the application program has an architecture and the apparatus further comprises an architecture specific services element for encapsulating application program architecture details.

10. The apparatus for goal directed debugging of an application program according to claim 1, wherein the application program is written in a programming language and the apparatus further comprises a language specific services element for encapsulating application program language details.

11. The apparatus for goal directed debugging of an application program according to claim 1, further comprising a symbolic information database.

12. The apparatus for goal directed debugging of an application program according to claim 1, wherein the program control element comprises a target program state notification element for notifying the one or more debugging goals when the application program reaches a predetermined state.

13. The apparatus for goal directed debugging of an application program according to claim 1, wherein at least one of the goals comprises a list of actions to be performed by the at least one goal when the application program reaches predetermined states.

14. The apparatus for goal directed debugging of an application program according to claim 1, wherein at least one of the goals comprises a list of one or more events for which the at least one goal has registered with the program control element to receive notification when the one or more events occur.

15. The apparatus for goal directed debugging of an application program according to claim 1 further comprising a constraint manager for monitoring the one or more goals and controlling execution of the application program in response to the monitoring to run the application program with a least number of constraints.

16. The apparatus for goal directed debugging of an application program according to claim 1, wherein the goal developer comprises a goal constructor for constructing goals which will provide information concerning the cause of the problem.

17. A method for goal directed debugging of an application program, the method comprising the steps of:
   (a) receiving a request from a user for information concerning a cause of an observed problem in the application program;
   (b) breaking down and creating from the request one or more debugging goals, which, when accomplished, will provide information concerning the cause of the problem;
   (c) selectively executing one or more debugging programs to accomplish each of the one or more debugging goals;
   (d) collecting information from the application program executing under control of one or more debugging programs; and
   (e) determining a cause of the problem from the information and reporting the information to the user.

18. The method for goal directed debugging of an application program according to claim 17, further comprising the steps of:
   assessing a context of the application program at various points in its operation; and
   utilizing the context of the application program when developing the one or more goals based on the request.

19. The method for goal directed debugging of an application program according to claim 17, including the step of developing one or more debug hypotheses based on the request regarding a failure which resulted in the problem.

20. The method for goal directed debugging of an application program according to claim 19, wherein the step of developing one or more debug hypotheses includes the steps of:
   testing the one or more debug hypotheses; and
   developing one or more alternative debug hypotheses when a tested debug hypothesis is found to be incorrect.

21. The method for goal directed debugging of an application program according to claim 19, wherein the step of developing the one or more debug hypotheses based on the request includes the step of utilizing program execution information from the application program executing under control of the debugging programs to modify one or more of the debug hypotheses to more accurately determine the failure.

22. The method for goal directed debugging of an application program according to claim 17, further comprising the step of developing one or more backtrack hypotheses which indicate the cause of the failure in response to a first of the debug hypotheses being determined as correctly indicating the failure.

23. The method for goal directed debugging of an application program according to claim 17, further comprising the steps of testing the one or more backtrack hypotheses and maintaining a backtrack trail of the test results.

24. The method for goal directed debugging of an application program according to claim 17, further comprising the steps of developing one or more subgoals to implement the one or more goals; and selectively executing the one or more debugging programs based on the at least one or more subgoals.

25. The method for goal directed debugging of an application program according to claim 17, further comprising the step of interpreting the application program.

26. The method for goal directed debugging of an application program according to claim 17, wherein the application program has an architecture and the method further comprises the step of encapsulating architecture details.

27. The method for goal directed debugging of an application program according to claim 17, wherein the application program is written in a programming language and the method further comprises the step of encapsulating application program language details.

28. The method for goal directed debugging of an application program according to claim 17, further comprising the step of maintaining a symbolic information database.

29. The method for goal directed debugging of an application program according to claim 17, further comprising the step of notifying the one or more debugging goals when the application program reaches a predetermined state.

30. The method for goal directed debugging of an application program according to claim 17, further comprising the step of performing an action by the at least one goal when the application program reaches one or more predetermined states.

31. The method for goal directed debugging of an application program according to claim 17, further comprising the step of notifying at least one goal of one or more events for which the at least one goal has registered with a program control element to receive notification when the one or more events occur.

32. The method for goal directed debugging of an application program according to claim 17, further comprising the step of monitoring the one or more goals and controlling execution of the application program in response to the monitoring to run the application program with a least number of constraints.

33. The method for goal directed debugging of an application program according to claim 17, further comprising the step of constructing goals which will provide information concerning the cause of the problem.

34. A computer program product for goal directed debugging of an application program, the computer program product comprising a computer usable medium having computer readable program code thereon including:
   (a) program code for receiving a request from a user for information concerning a cause of an observed problem in the application program;
   (b) program code for breaking down and creating from the request one or more debugging goals, which, when accomplished, will provide information concerning the cause of the problem;
   (c) program code for selectively executing one or more debugging programs to accomplish each of the one or more debugging goals;
   (d) program code for collecting information from the application program executing under control of one or more debugging programs; and (e) program code for determining a cause of the problem from the information and reporting the information to the user.

35. The computer program product for goal directed debugging of an application program according to claim 34, further comprising:

program code for assessing a context of the application program at various points in its operation; and program code for utilizing the context of the application program when developing the one or more goals based on the request.

36. The computer program product for goal directed debugging of an application program according to claim 34, including program code for developing one or more debug hypotheses based on the request regarding a failure which resulted in the problem.

37. The computer program product for goal directed debugging of an application program according to claim 36, wherein the program code for developing one or more debug hypotheses includes:

program code for testing the one or more debug hypotheses; and program code for developing one or more alternative debug hypotheses when a tested debug hypothesis is found to be incorrect.

38. The computer program product for goal directed debugging of an application program according to claim 36, wherein the program code for developing the one or more debug hypotheses based on the request includes program code for utilizing program execution information from the application program executing under control of the debugging programs to modify one or more of the debug hypotheses to more accurately determine the failure.

39. The computer program product for goal directed debugging of an application program according to claim 34, further comprising program code for developing one or more backtrack hypotheses which indicate the cause of the failure in response to a first of the debug hypotheses being determined as correctly indicating the failure.

40. The computer program product for goal directed debugging of an application program according to claim 34, further comprising program code for testing the one or more backtrack hypotheses and program code for maintaining a backtrack trail of the test results.

41. The computer program product for goal directed debugging of an application program according to claim 34, further comprising program code for developing one or more subgoals to implement the one or more goals; and program code for selectively executing the one or more debugging programs based on the at least one or more subgoals.

42. The computer program product for goal directed debugging of an application program according to claim 34, further comprising program code for interpreting the application program.

43. The computer program product for goal directed debugging of an application program according to claim 34, wherein the application program has an architecture and the computer program product further comprises program code for encapsulating architecture details.

44. The computer program product for goal directed debugging of an application program according to claim 34, wherein the application program is written in a programming language and the computer program product further comprises program code for encapsulating application program language details.

45. The computer program product for goal directed debugging of an application program according to claim 34, further comprising program code for notifying the one or more debugging goals when the application program reaches a predetermined state.

46. The computer program product for goal directed debugging of an application program according to claim 34, further comprising program code for performing an action by the at least one goal when the application program reaches one or more predetermined states.

47. The computer program product for goal directed debugging of an application program according to claim 34, further comprising program code for notifying at least one goal of one or more events for which the at least one goal has registered with a program control element to receive notification when the one or more events occur.

48. The computer program product for goal directed debugging of an application program according to claim 34, further comprising program code for monitoring the one or more goals and controlling execution of the application program in response to the monitoring to run the application program with a least number of constraints.

49. The computer program product for goal directed debugging of an application program according to claim 34, further comprising program code for constructing goals which will provide information concerning the cause of the problem.

* * * * *